United States Patent
Hikichi

(10) Patent No.: US 11,726,723 B2
(45) Date of Patent: Aug. 15, 2023

(54) PRINTING SYSTEM, CONTROL METHOD FOR PRINTING SYSTEM, AND STORAGE MEDIUM

(71) Applicant: CANON KABUSHIKI KAISHA, Tokyo (JP)

(72) Inventor: Yukiyoshi Hikichi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/737,836

(22) Filed: May 5, 2022

(65) Prior Publication Data
US 2022/0365733 A1 Nov. 17, 2022

(30) Foreign Application Priority Data
May 12, 2021 (JP) .................. 2021-081296

(51) Int. Cl.
*G06F 3/12* (2006.01)
(52) U.S. Cl.
CPC .......... *G06F 3/1208* (2013.01); *G06F 3/1204* (2013.01); *G06F 3/1238* (2013.01); *G06F 3/1254* (2013.01); *G06F 3/1256* (2013.01); *G06F 3/12* (2013.01)
(58) Field of Classification Search
CPC .... G06F 3/1208; G06F 3/1204; G06F 3/1238; G06F 3/1254; G06F 3/1256; G03G 15/1675; G03G 15/5016; G03G 15/5091; G03G 15/5062
USPC ..................................................... 358/3.24
See application file for complete search history.

(56) References Cited

U.S. PATENT DOCUMENTS

| | | | |
|---|---|---|---|
| 2007/0126851 A1* | 6/2007 | Yamazaki .......... | H04N 1/00045 347/133 |
| 2010/0053680 A1* | 3/2010 | Sato ................. | G03G 15/50 358/1.15 |
| 2010/0085584 A1 | 4/2010 | Tanaka | |
| 2011/0216341 A1* | 9/2011 | Moro ................. | G06F 3/1285 358/1.13 |
| 2013/0336676 A1 | 12/2013 | Takahashi | |
| 2016/0156795 A1 | 6/2016 | Kikuchi | |
| 2018/0159989 A1 | 6/2018 | Mizuno | |
| 2018/0173478 A1 | 6/2018 | Hayakawa | |
| 2020/0304649 A1* | 9/2020 | Nakano ............. | H04N 1/0057 |

FOREIGN PATENT DOCUMENTS

JP 2013037185 A 2/2013

* cited by examiner

*Primary Examiner* — Darryl V Dottin
(74) *Attorney, Agent, or Firm* — Canon U.S.A., Inc. I.P. Division

(57) ABSTRACT

A printing system includes a printing unit, an operation unit, and a control unit. The printing unit prints an image on a sheet, conveys the sheet to a reading unit, and performs adjustment for printing an image on the sheet based on an image read by the reading unit. The control unit performs an operation of controlling to execute a manual adjustment function for adjusting predetermined adjustment items based on adjustment values received via the operation unit after authentication of an operator. The control unit performs another operation of controlling to execute an automatic adjustment function for adjusting the predetermined adjustment items based on the image read by the reading unit without the authentication of the operator.

26 Claims, 21 Drawing Sheets

FIG. 8

| SHEET ID | SHEET NAME | BASIS WEIGHT | SIZE | WIDTH | HEIGHT | SURFACE SMOOTHNESS | CONVEYANCE OF FIRST FIXING UNIT | ... | SECONDARY TRANSFER VOLTAGE FOR FRONT OF SHEET |
|---|---|---|---|---|---|---|---|---|---|
| 1 | SHEET A | 216 | A4 | 297 | 210 | HIGH-QUALITY PAPER | 0 | ... | 0 |
| 2 | SHEET B | 148 | A4 | 297 | 210 | HIGH-QUALITY PAPER | -1 | ... | 0 |
| 3 | SHEET C | 90 | 11x17 | 279.4 | 431.8 | RECYCLE PAPER | 0 | ... | 1 |
| 4 | SHEET D | 90 | A3 | 297 | 420 | MAT COAT | -10 | ... | 0 |
| 5 | SHEET E | 350 | A3 | 297 | 420 | EMBOSS | 0 | ... | 2 |
| ... | ... | ... | ... | ... | ... | ... | ... | ... | ... |

AUTOMATIC ADJUSTMENT OF SECONDARY TRANSFER VOLTAGE

CHART RANGE TO PRINT :
● ROUGH ADJUSTMENT ⎤
○ FINE ADJUSTMENT ⎦ — 1201

SIDE OF SHEET TO BE PRINTED :
○ ONLY ON FRONT SIDE ⎤
● BOTH SIDES ⎦ — 1202

SHEET SOURCE :
☐ SHEET FEED TRAY 1 — 1205

[MANUAL ADJUSTMENT] [EXECUTE] 1203 [CANCEL] 1204

FIG. 12B

ADJUSTMENT IS COMPLETED

FRONT SIDE : 0 → +2 — 1211
BACK SIDE : 0 → +1

[MANUAL ADJUSTMENT] — 1212    [OK] — 1213

FIG. 12C

ADJUSTMENT OF SECONDARY TRANSFER VOLTAGE   (?)   [CHART PRINT..] — 1221

ADJUST VOLTAGE VALUE WHEN TRANSFERRING TO SHEET.
CHECK PRINTED CHART TO INPUT OPTIMUM VOLTAGE VALUE.
("*" IS PRINTED ON FRONT SIDE AND "**" IS PRINTED ON BACK SIDE OF CHART.
VALUES OF CURRENT SETTING ARE PRINTED IN MAGENTA.)

FRONT SIDE :
[ − ] [ 0 ] [ + ]  (−20 ~ +20)
BACK SIDE :
[ − ] [ 0 ] [ + ]  (−20 ~ +20)
1223 ⎦ — 1222

[OK] 1224  [CANCEL]   [APPLY]

FIG. 12D

CHART PRINT                                          ✕

CHART RANGE TO PRINT :
● AROUND SET VOLTAGE ⎤
○ ALL ⎦ — 1231

SIDE OF SHEET TO BE PRINTED :
● ONLY ON FRONT SIDE ⎤
○ BOTH SIDES ⎦ — 1232

SHEET SOURCE :
☐ SHEET FEED TRAY 1 — 1233

[PRINT] — 1234    [CANCEL] — 1235

FIG. 15
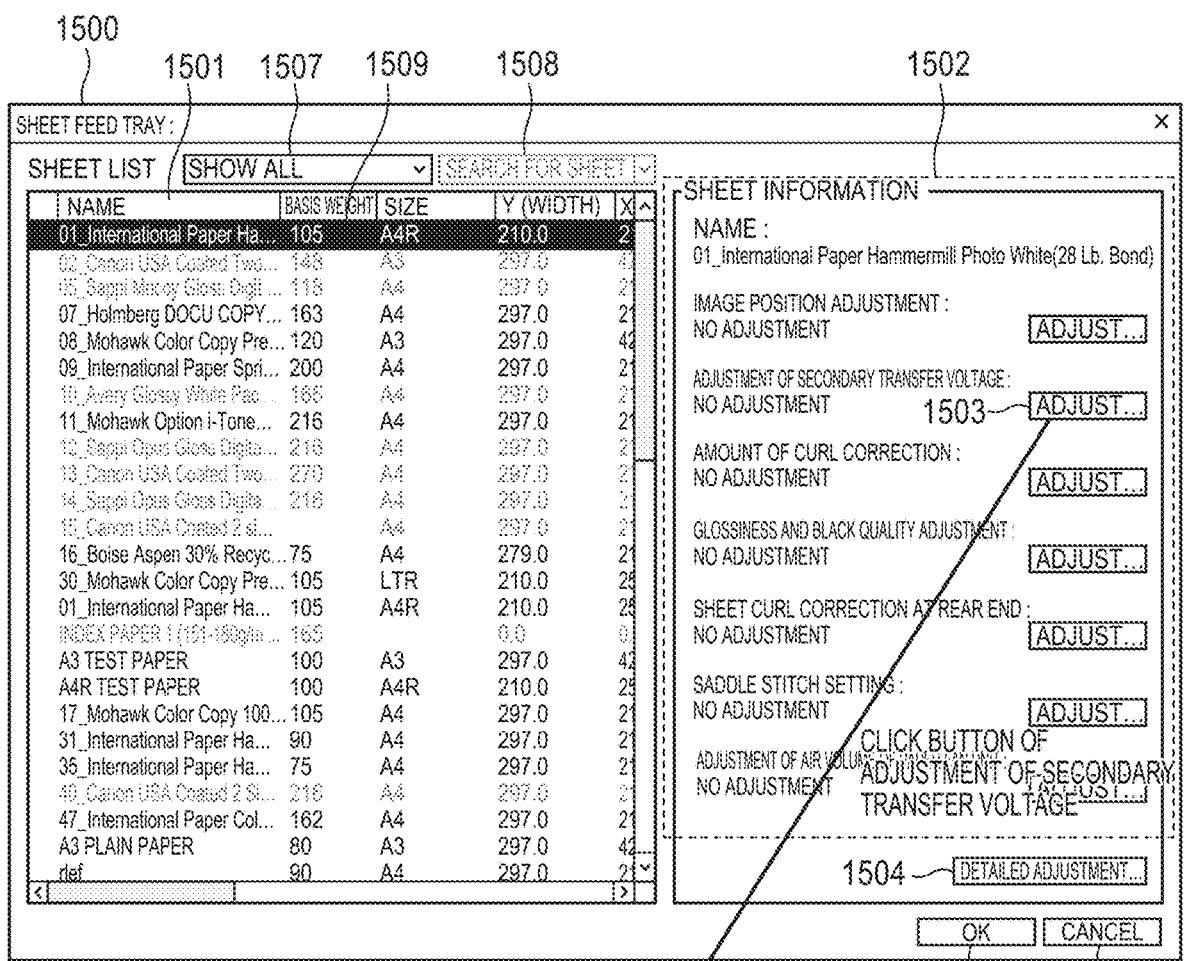
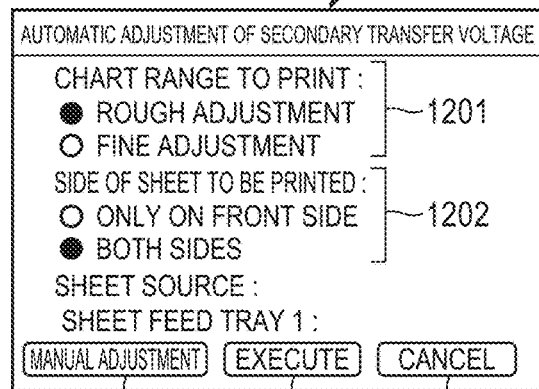

| GROUP | ADJUSTMENT ITEM | AUTOMATIC ADJUSTMENT | REQUIRE AUTHENTICATION FOR MANUAL ADJUSTMENT |
|---|---|---|---|
| IMAGE QUALITY | GLOSSINESS AND BLACK QUALITY ADJUSTMENT | NO | YES |
| | ADJUSTMENT OF SECONDARY TRANSFER VOLTAGE | YES | YES |
| IMAGE POSITION | IMAGE POSITION ADJUSTMENT | YES | YES |
| | MARGIN ADJUSTMENT AT FRONT END/REAR END | NO | NO |
| | SHEET CONVEYANCE ADJUSTMENT FOR REVERSING/DISCHARGE UNIT | NO | YES |

FIG. 21

| SHEET ID | SHEET NAME | BASIS WEIGHT | SIZE | WIDTH | HEIGHT | SURFACE SMOOTHNESS | ... | CONVEYANCE OF FIRST FIXING UNIT | ... | REQUIRE AUTHENTICATION FOR MANUAL ADJUSTMENT | ... |
|---|---|---|---|---|---|---|---|---|---|---|---|
| 1 | SHEET A | 216 | A4 | 297 | 210 | HIGH-QUALITY PAPER | ... | 0 | ... | NO | ... |
| 2 | SHEET B | 148 | A4 | 297 | 210 | HIGH-QUALITY PAPER | ... | -1 | ... | NO | ... |
| 3 | SHEET C | 90 | 11x17 | 279.4 | 431.8 | RECYCLE PAPER | ... | 0 | ... | YES | ... |
| 4 | SHEET D | 90 | A3 | 297 | 420 | MAT COAT | ... | -10 | ... | YES | ... |
| 5 | SHEET E | 350 | A3 | 297 | 420 | EMBOSS | ... | 0 | ... | YES | ... |
| ... | ... | ... | ... | ... | ... | ... | ... | ... | ... | ... | ... |

2100

PRINTING SYSTEM, CONTROL METHOD FOR PRINTING SYSTEM, AND STORAGE MEDIUM

BACKGROUND

Field

The present disclosure relates to a printing system, a control method for the printing system, and a storage medium.

Description of the Related Art

There is a method in which an image is printed on a sheet, the sheet is set in a scanner by a user, and the secondary transfer voltage is automatically adjusted by reading the image (see Japanese Patent Application Laid-Open No. 2013-37185).

Further, conventionally, there is a method in which the image is printed on the sheet, the sheet is conveyed to a reader, and the image is read by the reader to adjust the secondary transfer voltage or the like. The method reduces the user's effort to adjust.

In the case of adjustment without using the result read by the reader, it is required to perform operations such as an input of a correct adjustment value. Therefore, it is desirable to perform authentication before the adjustment in order to have an operator who knows to perform the adjustment correctly perform the adjustment.

On the other hand, when the adjustment is performed using the result read by the reader, there is a low possibility of making a mistake in the operation such as the input of adjustment values. If authentication is requested even in such a case, unnecessary operation for authentication is required to the operator.

SUMMARY

According to an aspect of the present disclosure, a printing system includes a printing unit configured to print an image on a sheet, to convey the sheet to a reading unit, and to perform adjustment for printing an image on the sheet based on an image read by the reading unit, an operation unit, and a control unit configured to perform operations including: controlling to execute a manual adjustment function for adjusting predetermined adjustment items based on adjustment values received via the operation unit after authentication of an operator, and controlling to execute an automatic adjustment function for adjusting the predetermined adjustment items based on the image read by the reading unit without the authentication of the operator.

Further features of the present disclosure will become apparent from the following description of exemplary embodiments with reference to the attached drawings.

BRIEF DESCRIPTION OF THE DRAWINGS

FIG. 8 is a diagram illustrating an example of a sheet setting management table provided in the print control apparatus according to the first embodiment.

FIG. 12A is a diagram illustrating an operation screen of secondary transfer voltage of the paper management application according to the first embodiment.

FIG. 12B is a diagram illustrating the operation screen of secondary transfer voltage of the paper management application according to the first embodiment.

FIG. 12C is a diagram illustrating the operation screen of secondary transfer voltage of the paper management application according to the first embodiment.

FIG. 12D is a diagram illustrating the operation screen of secondary transfer voltage of the paper management application according to the first embodiment.

FIG. 15 is the operation screen flow of the paper management application in the first embodiment.

FIG. 16 is the operation screen flow of the paper management application in the first embodiment.

FIG. 20 is a diagram illustrating an example of the authentication setting screen of the paper management application according to the third embodiment.

FIG. 21 is a diagram illustrating an example of the authentication setting screen of the paper management application according to the third embodiment.

DESCRIPTION OF THE EMBODIMENTS

Figure 1:
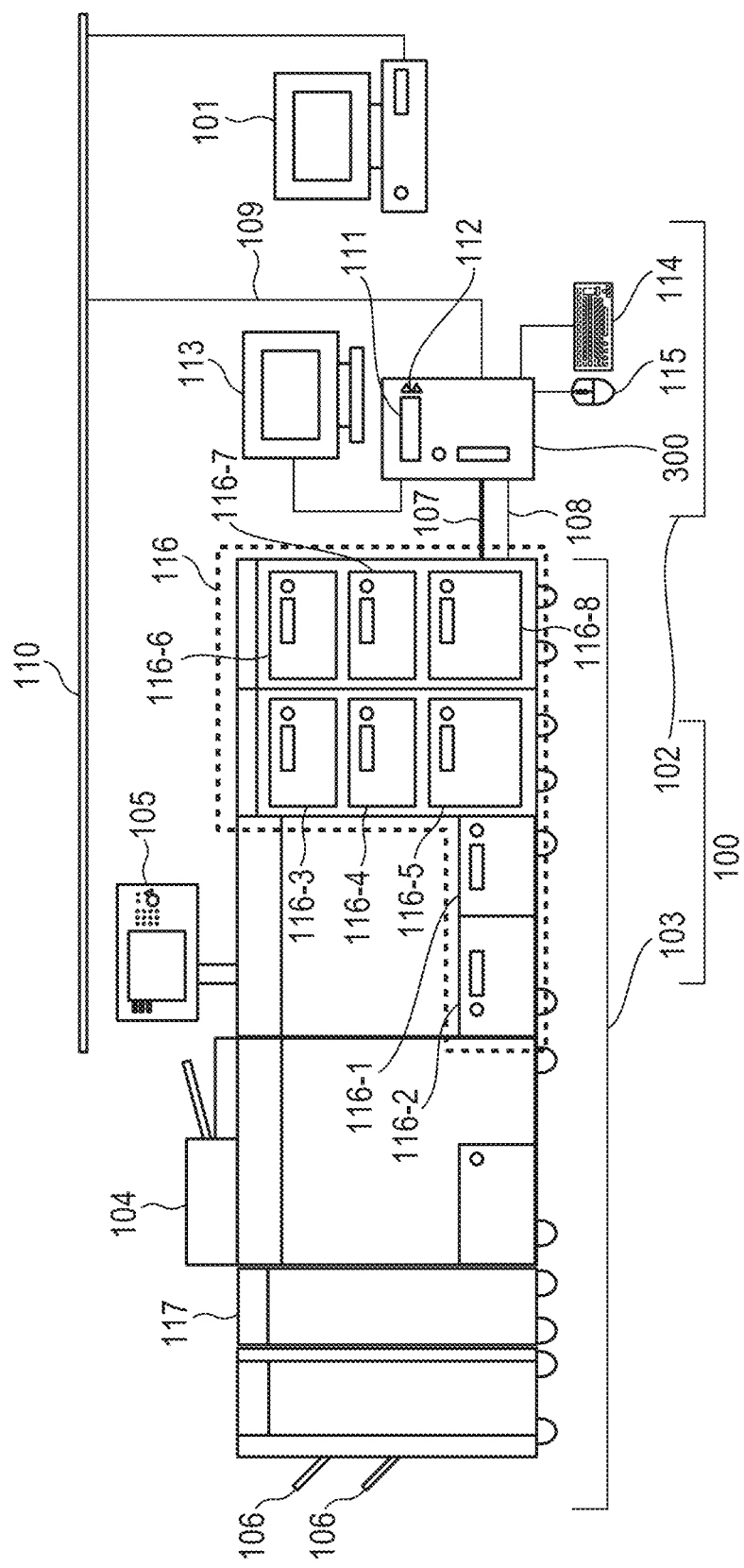
FIG. 1 is a block diagram illustrating the overall configuration of a printing system according to the first embodiment.

The best embodiment of the present disclosure will now be described with reference to the drawings. It should be noted that the following embodiments are not intended to limit the disclosure, and not all of the combinations of features described in this embodiment are essential to the disclosure. The same components will be described with the same reference numerals.

First Embodiment

FIG. 1 is a block diagram illustrating the overall configuration of a printing system 100 according to the first embodiment.

The printing system 100 includes an image forming apparatus 103 and a print control apparatus 102. The printing system 100 is communicably connected to a client computer 101. The client computer 101 and the print control apparatus 102 are communicably connected via a local area network (LAN) 110 using an Ethernet cable 109. The print control apparatus 102 and the image forming apparatus 103 are connected via an image video cable 107 and a control cable 108.

In this embodiment, the image forming apparatus 103 is not directly connected to the LAN 110. The image forming apparatus 103 and the client computer 101 communicate via the print control apparatus 102. The image forming apparatus 103 may be connected to the LAN 110. That is, the image forming apparatus 103 may be directly connected to the client computer 101 in a communicable manner. The client computer 101 starts applications and gives print instructions to the printing system 100. The print control apparatus 102 performs image processing in cooperation with the image forming apparatus 103.

The image forming apparatus 103 is a multifunction machine having various functions, and not only performs image processing from the client computer 101 and the print control apparatus 102, but also can copy data read by a scanner unit 104 or transmit the data to a shared folder. When the image is scanned by the scanner unit 104, various instructions are received from the user via various keys on the operation panel 105. An operation panel 105 displays various information such as a scan state through the panel. A tray 106 receives the sheet on which the image is formed and discharges the sheet to the received sheet.

The print control apparatus 102 has a controller 300 and a display unit 111, and information in the print control apparatus 102 is displayed on the display unit 111. The user operates an operation button unit 112 of hardware of the print control apparatus 102 to operate information displayed on the display unit 111. The information displayed on the display unit 111 is used for displaying the information (power supply operation or confirmation of IP address) that is the minimum required for operating the print control apparatus 102. Further, a display device 113, a keyboard 114, and a pointing device 115 are connected to the print control apparatus 102. Although the printing system 100 is described in the first embodiment with the printing control apparatus 102 and the image forming apparatus 103 as separate systems, the processing of the printing control apparatus 102 may be included in the image forming apparatus 103, and the printing control apparatus 102 may not be physically arranged. Further, the display device 113 may have a position input device function such as a touch pad and may also function as the pointing device 115.

Sheet feed trays 116-1 to 116-8 (collectively referred to as a sheet feed unit 116) connected to the image forming apparatus 103 store sheets to be used for printing, and when a printing instruction is received, one sheet feed tray is selected and sheets are fed from the selected sheet feed tray. Note that the number of the sheet feed trays 116-1 to 116-8 provided in the sheet feed unit 116 increases or decreases depending on the optional configuration connected to the image forming apparatus 103.

A reading apparatus 117 incorporates a sensor for reading a printed chart for various adjustments such as image position (printing position) adjustment, density unevenness correction, and adjustment of secondary transfer voltage.

Figure 2A:
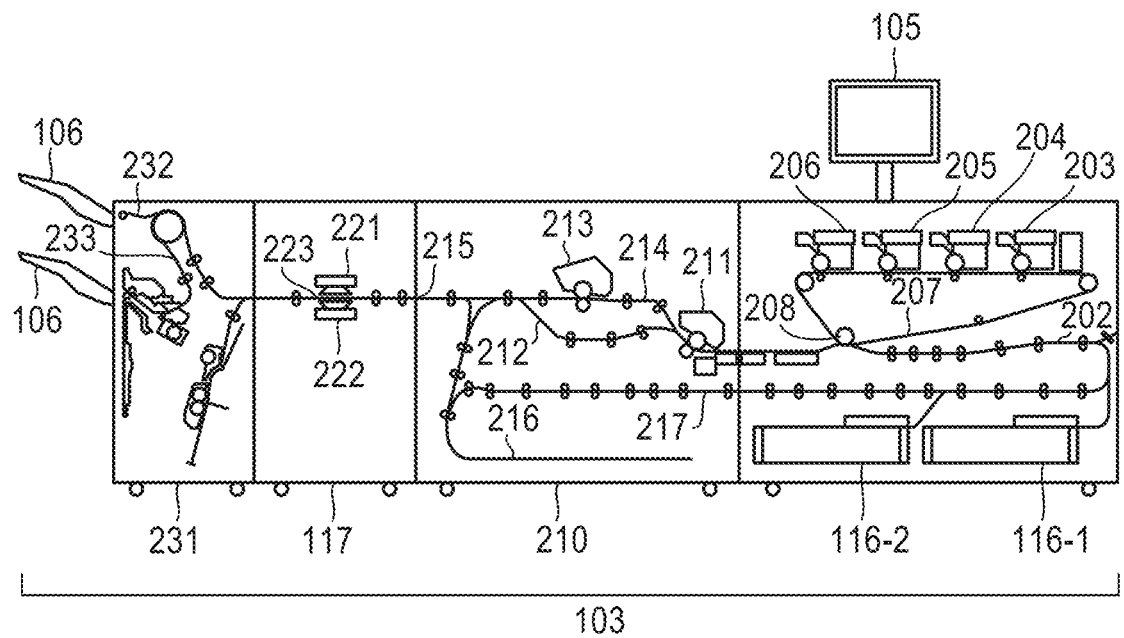
FIG. 2A is a cross-sectional view of an image forming apparatus with a reading apparatus according to the first embodiment.
Figure 2B:
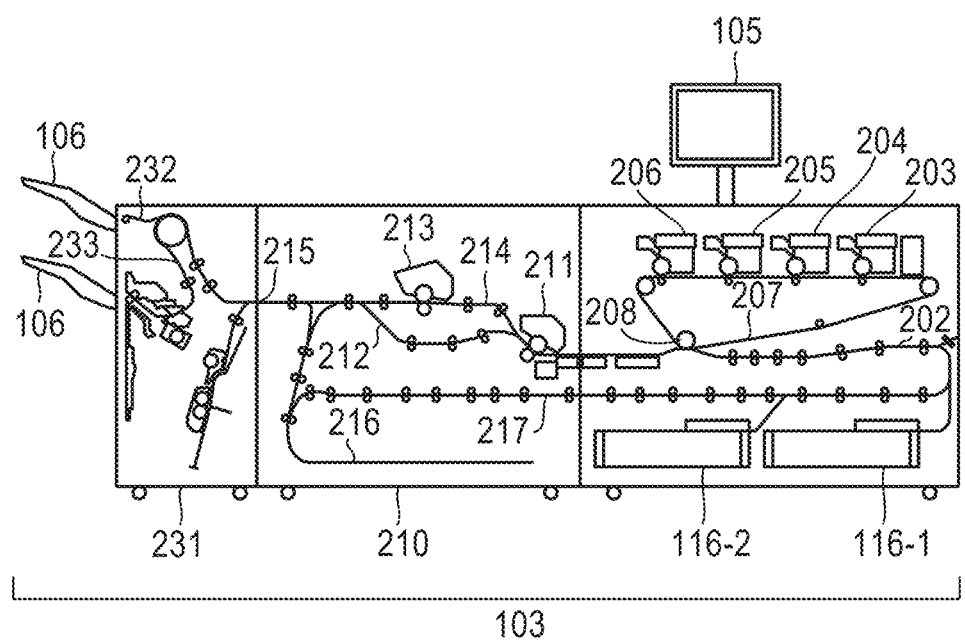
FIG. 2B is a cross-sectional view of the image forming apparatus without the reading apparatus according to the first embodiment.

FIGS. 2A and 2B show mechanical cross-sectional views of the image forming apparatus 103 (the sheet feed units 116-3 to 116-8 are omitted) relating to the first embodiment. The following will be described with reference to FIGS. 2A and 2B.

A print engine 210 includes the sheet feed trays 116-1 to 116-8 (the sheet feed trays 116-3 to 116-8 are omitted in the figures). Various sheets can be stored in each sheet feed unit. The sheet feed trays 116-1 to 116-8 separate only the uppermost sheet of the stored sheets and convey them to a sheet conveying path 202. Developing stations 203 to 206 form a toner image by using colored toner of Y, M, C and K, respectively. The formed toner image is first primarily transferred to an intermediate transfer belt 207. Then, the intermediate transfer belt 207 rotates clockwise in FIGS. 2A and 2B, and the toner image is transferred to the sheet conveyed from the sheet conveying path 202 by a secondary transfer roller 208. A fixing unit 211 is provided with a pressure roller and a heating roller, and the toner image is fixed to the sheet by passing the sheet between the rollers to melt and crimp the toner. The sheet passed through the fixing unit 211 is conveyed to a sheet conveying path 215 through a sheet conveying path 212. When the sheet type requires further melting and crimping for fixing, the sheet is conveyed to a second fixing unit 213 through a sheet conveying path 214 after passing through the fixing unit 211. The sheet subjected to additional melting and crimping by the second fixing unit 213 is conveyed to the sheet conveying path 215. When the printing mode is set to duplex printing, the sheet is conveyed to a sheet reversing path 216, the sheet is reversed, and then conveyed to a two-sided conveying path 217. Then, the second side image transfer is performed by the secondary transfer roller 208.

The sheet conveyed from the print engine 210 is conveyed to the reading apparatus 117. A first CIS (Contact Image Sensor) 221 and a second CIS 222 are vertically arranged in the reading apparatus 117. Although CIS is used for reading the sheet in the present embodiment, the CIS is not limited to be used for reading the sheet, as long as the CIS has a mechanism capable of reading patches or markers on the sheet. The first CIS reads the upper surface of the sheet, and the second CIS reads the lower surface of the sheet. The reading apparatus 117 reads a patch on the sheet by using the first CIS 221 and the second CIS 222 at the timing when the sheet conveyed to a sheet conveying path 223 reaches a predetermined position. Subsequently, the result read in accordance with the patch or marker is fed back to the print engine 210 as image position information, density information, or the like. The handling of the reading result will be described later. The reading apparatus 117 is an optional apparatus and is detachable from the print engine 210 and attachable to the print engine 210. The system with the reading apparatus 117 is illustrated in FIG. 2A, and the system without the reading apparatus 117 is illustrated in FIG. 2B.

A finisher 231 performs finishing processing such as stapling (binding at 1 place/2 places), punching (2 holes/3 holes), and binding in the middle to the conveyed sheet. The finisher 231 includes two trays 106. Each tray is ejected through sheet conveying paths 232 and 233. The finisher 231 is detachable from the print engine 210 or the reading apparatus 117 and attachable to the print engine 210 or the reading apparatus 117.

Figure 3:
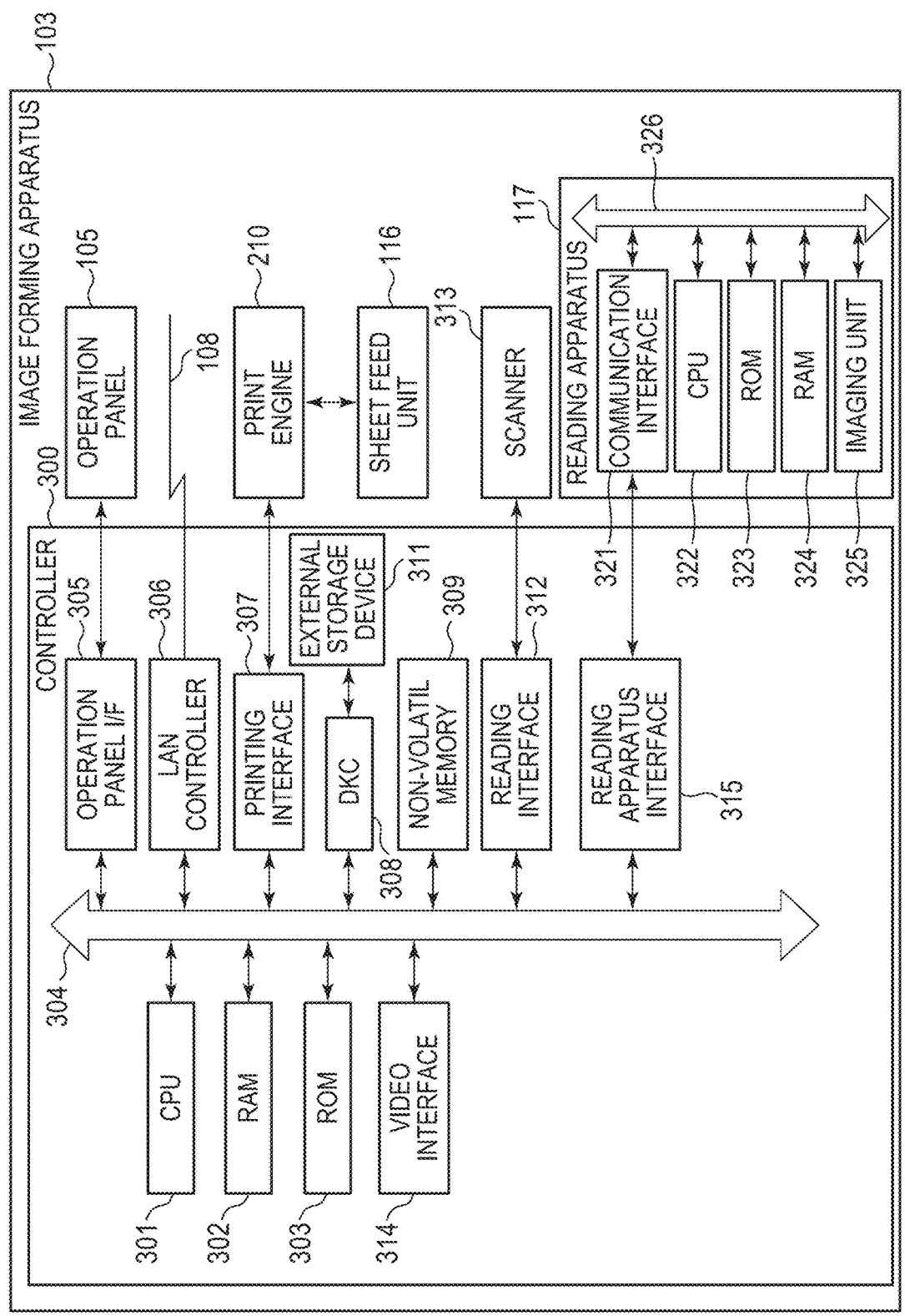
FIG. 3 is a block diagram illustrating a hardware configuration of the image forming apparatus according to the first embodiment.

FIG. 3 is a block diagram showing the hardware configuration of the image forming apparatus 103 according to the first embodiment.

The controller 300 has a CPU 301, and the CPU 301 deploys a control program stored in a ROM 303 or an external storage device 311 into a RAM 302, executes the deployed program, and comprehensively controls various devices connected to a system bus 304. Further, the CPU 301 outputs an image signal as output information to the printing unit (printer engine) 210 connected via a printing interface 307, or receives an image signal input from the scanner unit 104 connected via a reading interface 312. The CPU 301 controls the paper feed unit 116 connected to the print engine 210 through a print interface 307, and acquires the state of the paper feed unit 116. Further, the CPU 301 can perform communication processing between a LAN controller 306 and the print control apparatus 102 via the control cable 108. The RAM 302 mainly functions as a main memory, a work area, and the like of the CPU 301. The access to the external storage device 311 such as a hard disk (HDD) or an IC card is controlled by a disk controller (DKC) 308. The hard disk is used as a job storage area for storing application programs, font data, form data, etc., temporarily spooling print jobs, and externally controlling spooled jobs. Further, the HDD stores the image data input from scanner unit 104 and the image data of the print job as BOX data, is referred from the network, and is used as BOX data storage area for printing. In the first embodiment, the HDD is used as the external storage device 311, and various logs such as job logs and image logs are stored. The operation panel 105 is connected to the controller 300 through an operation panel interface 305, and the user can input various information from software keys or hardware keys. A non-volatile memory 309 stores various kinds of setting information set from the terminal via the operation panel 105 and the network 110. A video interface 314 receives the image data from the print control apparatus 102. The CPU 301 acquires patch and density information read by the reading apparatus 117 connected via a reading apparatus interface 315 and a communication interface 321 of the reading apparatus 117. In the reading apparatus 117, a CPU 322, a ROM 323, a RAM 324, and an imaging unit 325 are connected to a system bus 326, and read control of patches and markers and read patch and density information are transmitted to the print engine.

Figure 4A:
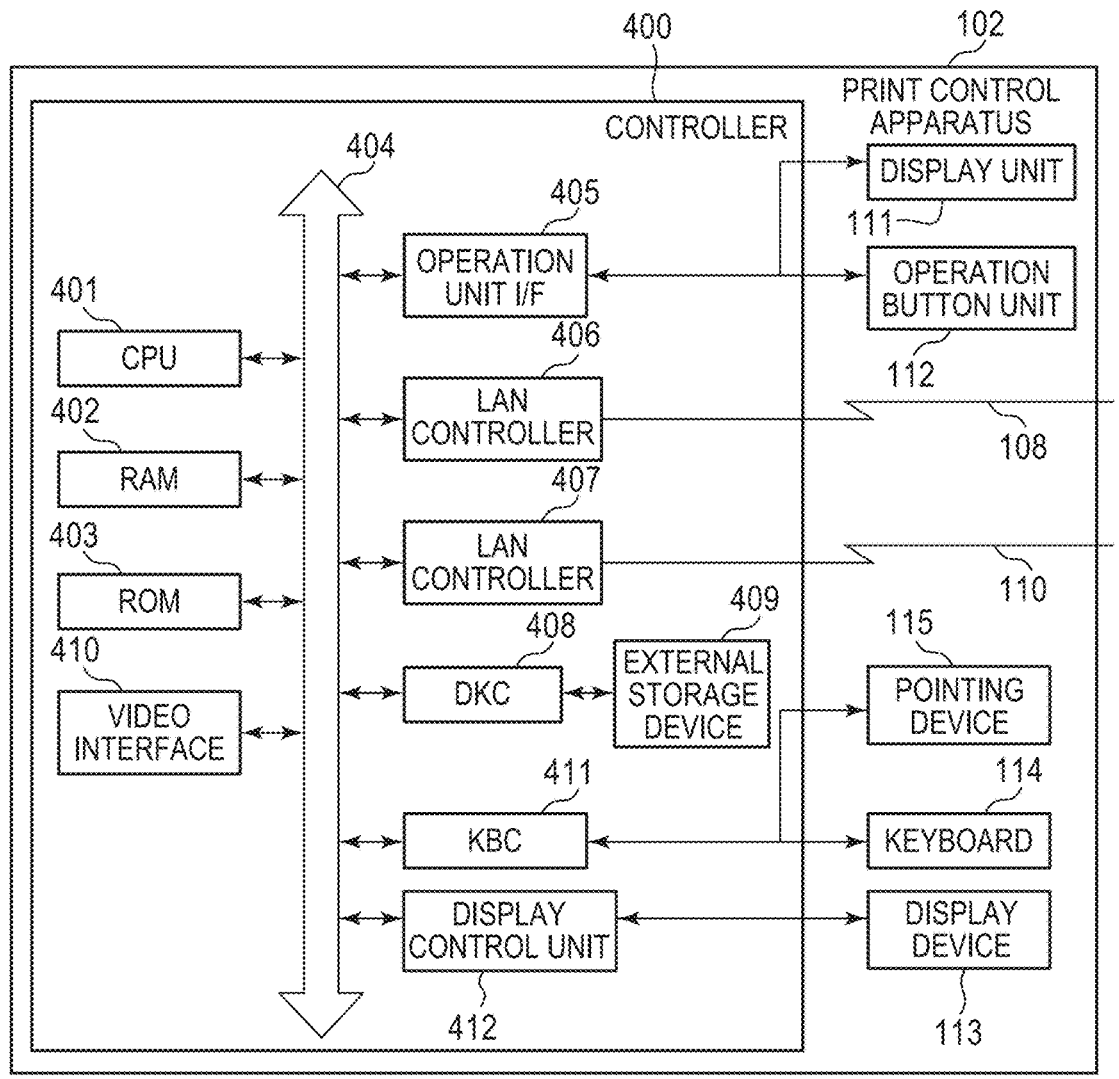
FIG. 4A is a block diagram illustrating a hardware configuration of a print control apparatus according to the first embodiment.

FIG. 4A is a block diagram illustrating a hardware configuration of the print control apparatus 102 according to the first embodiment.

A controller 400 has a CPU 401, and the CPU 401 deploys a control program stored in a ROM 403 or an external storage device 409 into a RAM 402. By executing the deployed program, various devices connected to a system bus 404 are generally controlled. The CPU 401 can communicate with the image forming apparatus 103 via a LAN controller 406 and the control cable 108. The CPU 401 can perform communication processing with the client computer 101 and the image forming apparatus 103 on the network via a LAN controller 407 and the LAN 110. The RAM 402 mainly functions as a main memory, a work area, and the like of the CPU 401. The access to the external storage device 409 such as a hard disk (HDD) or an IC card is controlled by a disk controller (DKC) 408. The hard disk stores application programs, font data, form data, etc., and spools a print job temporarily. The hard disk is used as a job storage area for RIP (Raster Image Processor) processing and resaving spooled jobs. An operation unit interface 405 controls an operation button unit 112 to which a user inputs various kinds of information, a display unit 111 for presenting information to the user, and an interface of the controller 400. A video interface 410 transmits RIP-processed image data to the image forming apparatus 103. A keyboard controller (KBC) 411 performs processing related to input of information from the keyboard 114 and the pointing device 115. A display control unit 412 has a video memory inside, draws image data in the video memory according to an instruction from the CPU 401, and outputs the image data drawn in the video memory to the display device 113 as a video signal.

Figure 4B:
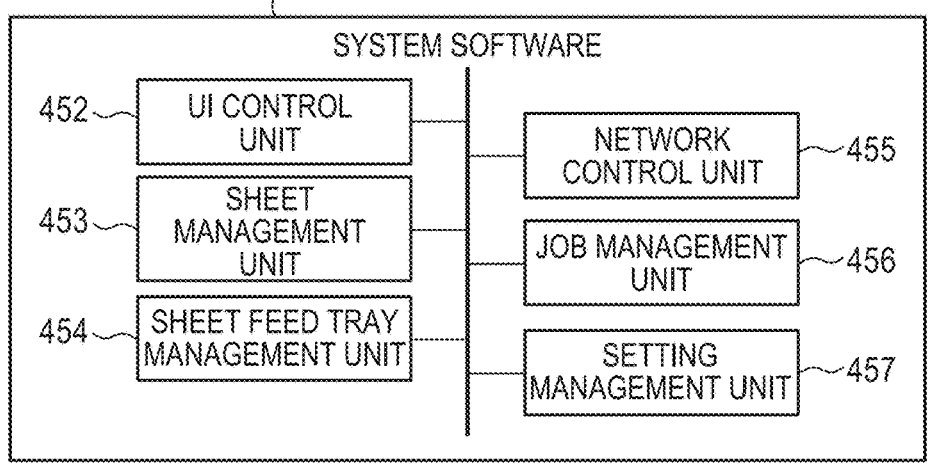
FIG. 4B is a block diagram illustrating a software configuration of a print control apparatus according to the first embodiment.

FIG. 4B is a block diagram illustrating the software configuration of the print control apparatus 102 according to the first embodiment. The functions of the components illustrated in FIG. 4B are achieved by the CPU 401 executing the program deployed in the RAM 402.

A system software 451 for controlling the print controller 102 includes a UI control unit 452, a sheet management unit 453, a sheet feed tray management unit 454, a network control unit 455, a job management unit 456, and a setting management unit 457. The UI control unit 452 controls the screen displayed by the printing system. The UI control unit 452 can control to switch the screen of the display unit system of texts and the paper size displayed on the screen according to a setting of the system. The sheet management unit 453 communicates with the image forming apparatus 103, and manages the acquired sheet information by the sheet setting management table 800 illustrated in FIG. 8.

The network control unit 455 controls communication between the image forming apparatus 103 via the LAN controller 406 and the client computer 101 on the network 110 via the LAN controller 407. The job management unit 456 manages a print processing sequence and an order of jobs. The job management unit 456 manages the jobs received by the print control apparatus 102 and controls data transfer for printing the received jobs to the image forming apparatus 103 via the LAN controller 406 or the video interface 410. The setting management unit 457 manages system settings related to a sheet management system. The system setting includes, for example, the language setting of the wording displayed on the screen of the sheet management system, the display unit system (millimeter or inch) setting of the sheet size, and the like.

Figure 5:
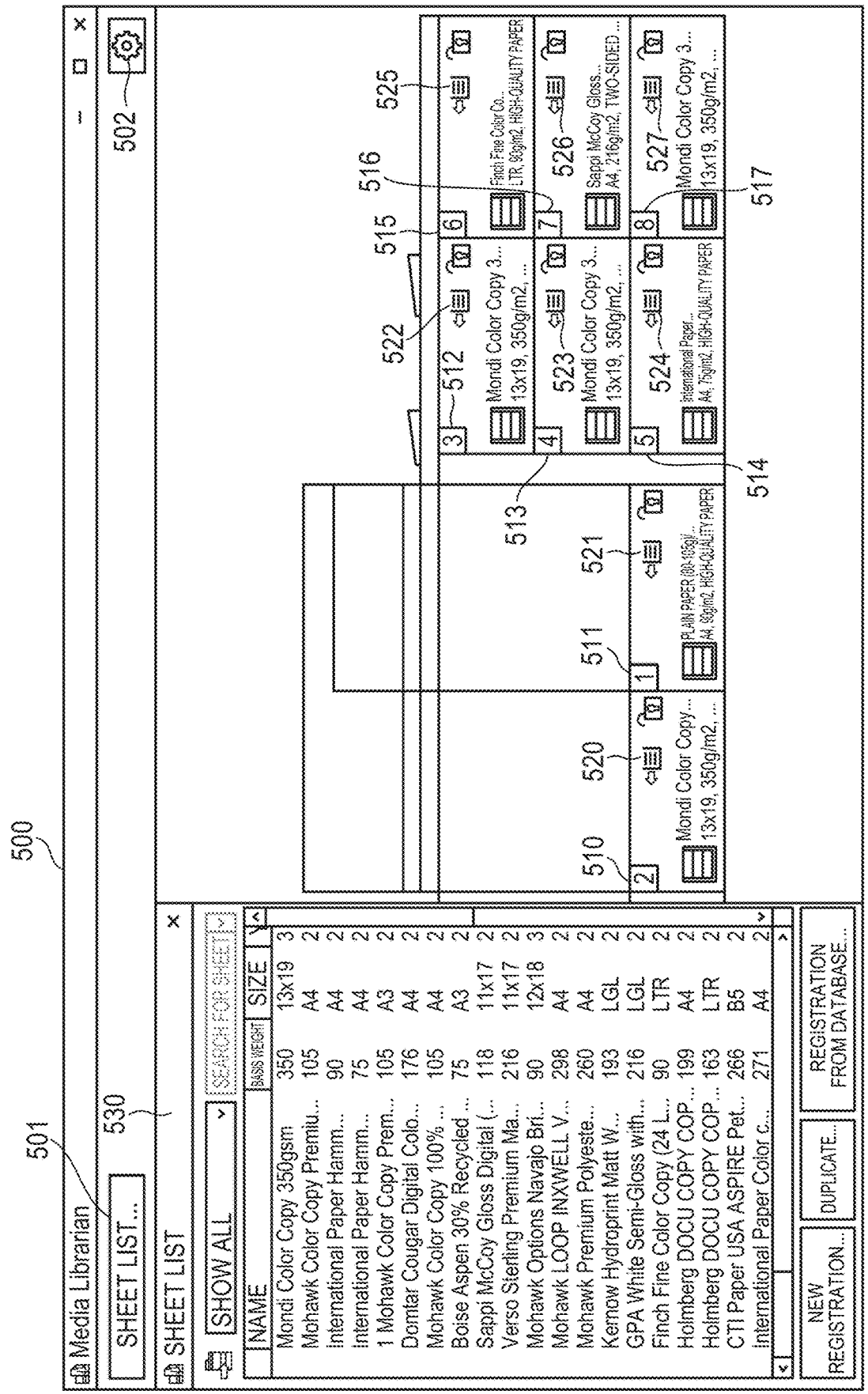
FIG. 5 is a diagram illustrating an example of a top screen of a paper management application executed by the print control apparatus according to the first embodiment.

FIG. 5 is a diagram illustrating an example of a top screen 500 of the sheet management application executed by the print control apparatus 102 according to the first embodiment.

The top screen 500 shows an example of a screen in a state in which information on the sheet feed tray of the image forming apparatus 103 connected to the print control apparatus 102 is displayed. The top screen 500 is drawn in the video memory according to an instruction from the CPU 401, and the image data drawn in the video memory is output to the display device 113 as a video signal and displayed.

When the sheet management application is started, the apparatus configuration information of the image forming apparatus 103 is acquired, and the correct image is displayed according to the option information. FIG. 5 illustrates a state in which eight sheet feeding stages are connected. Each of reference numerals 510 to 517 denotes a sheet feed tray button corresponding to each paper feed tray. Each of sheet feed tray open buttons 520 to 527 is a button for instructing to open the sheet feed tray. That is, when the sheet feed tray open button is pressed while the sheet feed tray is closed, the sheet feed tray is opened. The sheet management application creates and displays these sheet feed tray buttons on the basis of the information of the sheet feed tray of the image forming apparatus 103 acquired when the image forming apparatus is started. The sheet feed tray button has, for example, an area for displaying information such as a sheet name and a remaining sheet amount set in the sheet feed tray. When the state of the sheet feed tray is changed by the image forming apparatus 103 and the change event for the state of the sheet feed tray is received from the image forming apparatus 103, the controller 400 reacquires the sheet feed tray information. Then, the controller 400 redraws the display area of the sheet feed tray button according to the reacquired sheet feed tray information.

A sheet list button 501 is a button for instructing to display a sheet list screen 530. In the first embodiment, when the sheet list button 501 is depressed, the controller 400 displays the sheet list screen 530 on the front side.

A setting button 502 instructs to display a screen for changing the system setting of the sheet management application. When the setting button 502 is pressed, the controller 400 displays the current system setting according to the system setting stored in the external storage device 409.

Figure 6:
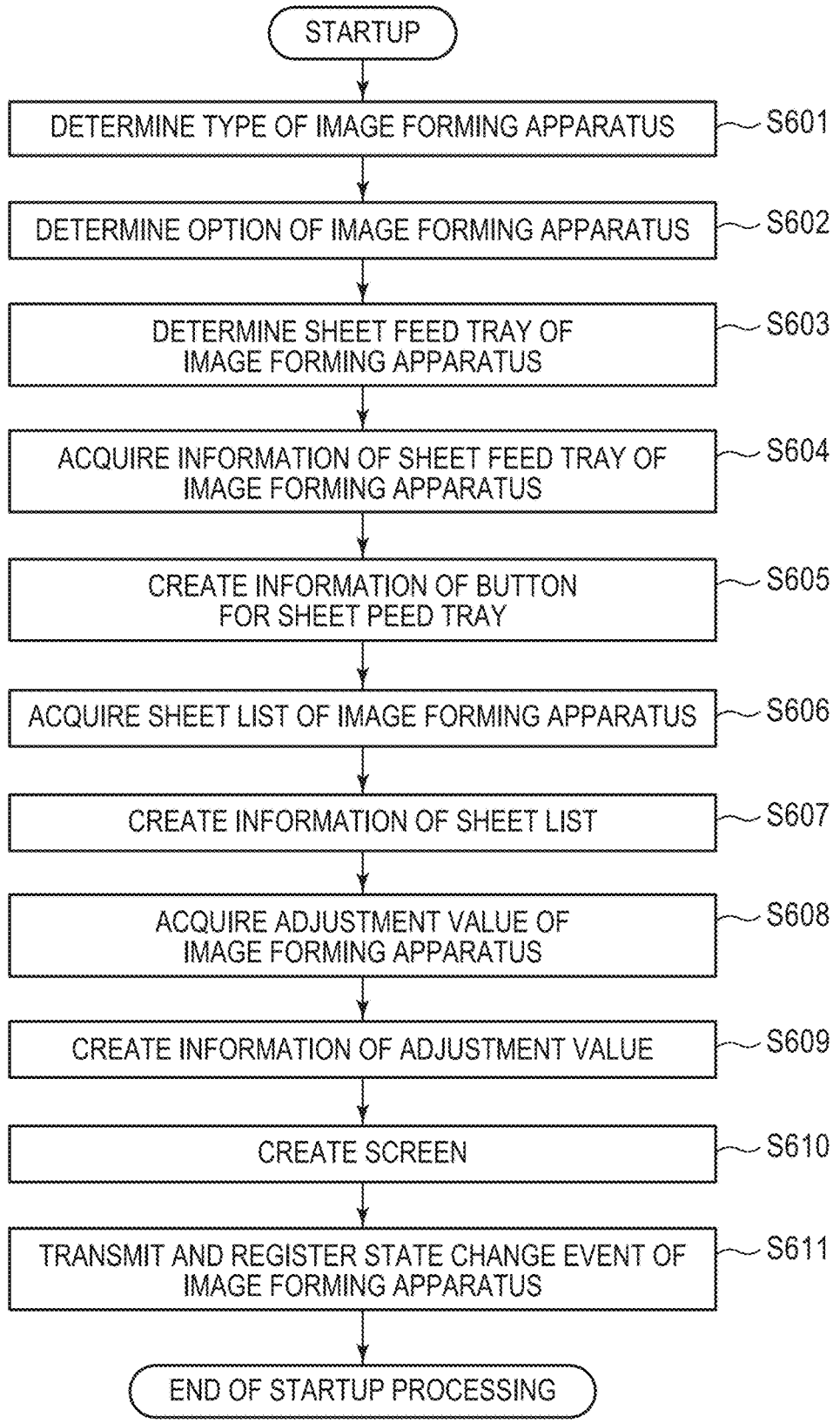
FIG. 6 is a flowchart illustrating the process of generating a top screen when the paper management application is started in the print control apparatus according to the first embodiment.

FIG. 6 is a flowchart illustrating a process of creating the top screen 500 when the sheet management application is started by the print control apparatus 102 according to the first embodiment. It should be noted that the sheet management application according to the first embodiment is operated by the print control apparatus 102, but it is not limited to this, and can be operated by, for example, the client computer 101 as well. Here, an example executed by the print control apparatus 102 will be described. The process shown in the flowchart is achieved by the CPU 401 deploying the program stored in the ROM 403 to the RAM 402 to execute the program.

This flowchart starts when the print control apparatus 102 is activated.

First, in step S601, the CPU 401 determines a type of the connected image forming apparatus 103 to be subjected to sheet management. Here, the CPU 401 determines the type of the image forming apparatus 103, and uses a result of the determination when creating the device configuration screen of the top screen 500 or absorbing the specification difference of each type. At this time, the CPU 401 communicates with the image forming apparatus 103, and acquires model information from information returned from the image forming apparatus 103 in step S707 of FIG. 7, which will be described later. Further, the CPU 401 determines a model of the image forming apparatus 103 based on prestored model determination information. When the model of the connected image forming apparatus 103 is determined, the process proceeds to step S602. In step S602, the CPU 401 communicates with the image forming apparatus 103, and acquires information on the device configuration of the image forming apparatus 103 from information returned in step S709 of FIG. 7. Then, the apparatus configuration connected to the image forming apparatus 103 is determined. Further, the CPU 401 uses the determination result when creating the device configuration screen of the top screen 500, when specifying the information of the paper feed stage, and when absorbing the specification difference of each model.

Next, the process proceeds to step S603, and the CPU 401 acquires the information of the sheet feed tray of the image forming apparatus 103 from the image forming apparatus 103. The information of the sheet feed tray includes a configuration of the sheet feed tray such as a sheet feed tray, a manual feed tray, and a long paper tray, and information on the sheet set in each sheet feed tray. Further, the CPU 401 determines a number of sheet feed trays connected to the image forming apparatus 103 to be subjected to sheet management. Then, in step S604, the CPU 401 communicates with the image forming apparatus 103 to acquire, from the information returned in step S711 of FIG. 7, the sheet information set in each sheet feed tray and the information on whether or not the corresponding sheet feed tray can be automatically pulled out by pressing the sheet feed tray open buttons 520 to 527. In step S605, the CPU 401 creates the information of the sheet feed buttons 510 to 517 to be displayed on the top screen 500. When the information of the buttons is created, in the case of the sheet feed tray capable of automatically pulling out a sheet feed tray by pressing the sheet feed tray open button, the sheet feed tray open buttons 520 to 527 are created and displayed on the sheet feed tray buttons 510 to 517.

Figure 7:
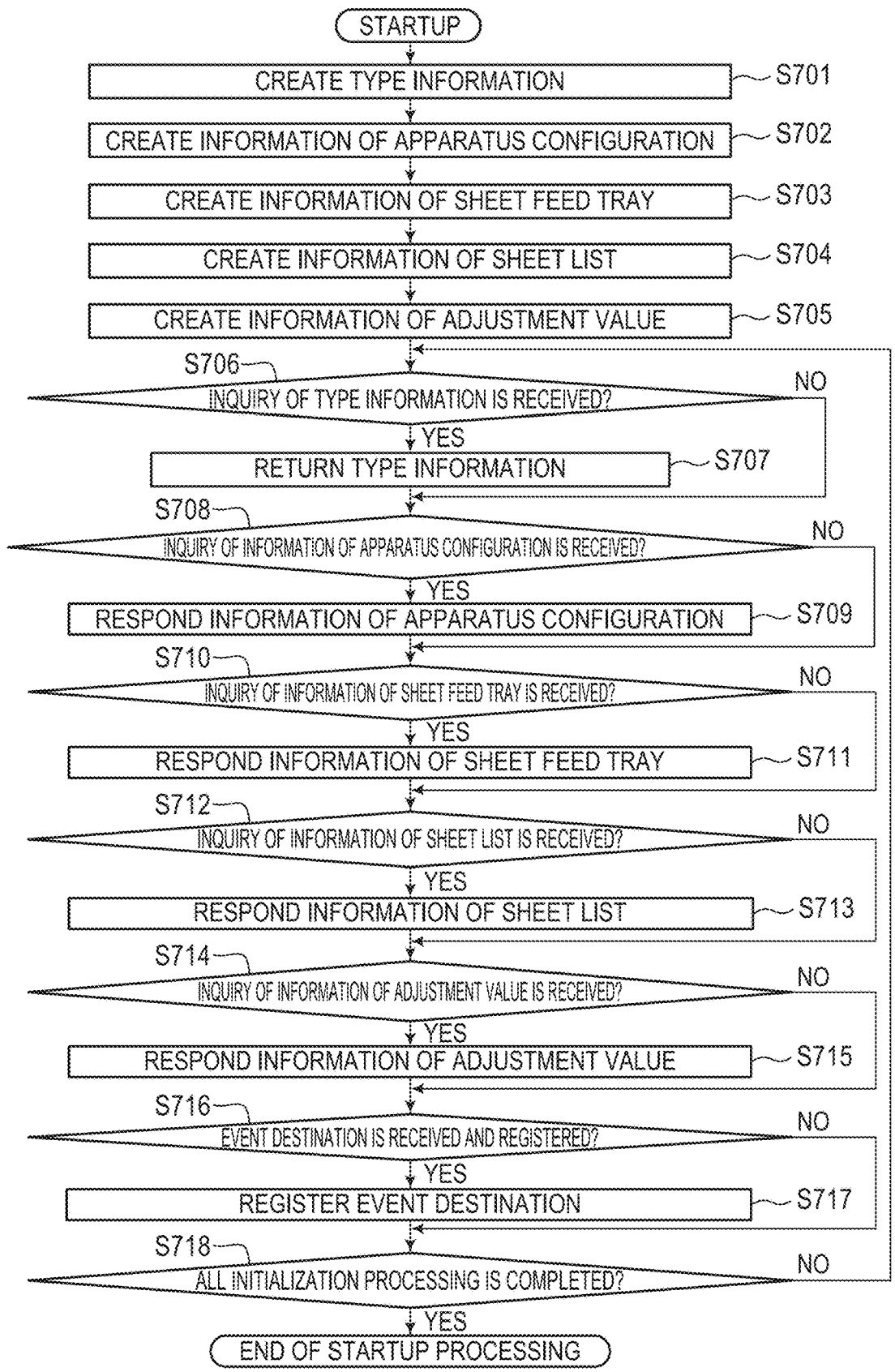
FIG. 7 is a flowchart illustrating the initialization processing of the image forming apparatus according to the first embodiment.

Next, in step S606, the CPU 401 communicates with the image forming apparatus 103 to acquire the information of the sheet list returned from the image forming apparatus 103 in step S713 of FIG. 7. Next, in step S607, the CPU 401 creates the information of the sheet list screen 530 to be displayed on the top screen 500. The sheet information on the sheet list screen 530 also includes information on whether the sheet can be set to each sheet feed tray of the image forming apparatus 103. Next, in step S608, the CPU 401 communicates with the image forming apparatus 103 for use in the adjustment value information display on the sheet list screen 530, and acquires the adjustment value of each adjustment from the information returned in step S715 of FIG. 7. In step S609, the CPU 401 creates a character string to be displayed in the sheet information based on the adjustment value acquired in step S608. Here, "Not adjusted" is displayed when the adjustment value does not change from the default value. "Adjusted" is displayed when the adjustment value changes from the default value. In step S610, the CPU 401 creates the top screen 500 based on the model device configuration information of the image forming apparatus 103 acquired in steps S601 and S602, the sheet feed stage button information created in step S605, the sheet list information created in step S607, and the adjustment value information created in step S609. Next, in step S611, the CPU 401 registers in the print control apparatus 102 the destination of the change notification event processing to be notified when the information of the sheet feed tray and the sheet information of the image forming apparatus 103 are changed to the image forming apparatus 103. When the registration is successful, the standby processing of the change notification event is performed. When the standby processing of the change notification event is executed, the start processing ends.

The processing in FIG. 6 is described as operations at the time of starting the sheet management application. However, the information of the sheet feed tray, the information of the sheet list, the adjustment values, etc. of the image forming apparatus 103 may be changed at any time during use of the sheet management application. Accordingly, the sheet management application, the communication with the image forming apparatus 103, and the update of each piece of information associated with the communication are executed as required regardless of whether the operation is performed by the sheet management application or the image forming apparatus 103. The information is synchronized between the sheet management application and the image forming apparatus 103.

FIG. 7 is a flowchart describing initialization processing of the image forming apparatus 103 according to the first embodiment. The process illustrated in the flowchart is achieved by the CPU 301 reading the program stored in the ROM 303 into the RAM 302 and executing the program.

First, in step S701, the CPU 301 acquires model information of the image forming apparatus 103 from the external storage device 311, and creates the data as returnable data. In step S702, the CPU 301 acquires the device configuration information connected to the image forming apparatus 103 from the external storage device 311, and creates the information as returnable data. Next, in step S703, the CPU 301 acquires the information of the sheet feed tray of the image forming apparatus 103 from the external storage device 311, and creates the information of the sheet feed tray as returnable data. Next, the process proceeds to step S704, where the CPU 301 acquires the information of the sheet list of the image forming apparatus 103 from the external storage device 311 and creates the information of the sheet list as returnable data. Next, the process proceeds to step S705, in which the CPU 301 acquires the information of the adjustment value of the image forming apparatus 103 from the external storage device 311, and creates the information of the adjustment value as returnable data. The acquisition of the information of the adjustment value is performed for all items adjustable for the image forming apparatus 103.

Next, the process proceeds to step S706, where the CPU 301 determines whether an inquiry of the model information from the print control apparatus 102 is received. If the inquiry of the model information is received in step S601 of FIG. 6, the process proceeds to step S707. In step S707, the model information created in step S701 is returned to the print control apparatus 102, and the process proceeds to step S708. In addition, even if the inquiry of the model information is not received in step S706, the process proceeds to step S708.

In step S708, the CPU 301 determines whether the inquiry of the device configuration information is received from the print control apparatus 102. If the inquiry of the device configuration information in step S602 of FIG. 6 is received, the process proceeds to step S709. In step S709, the CPU 301 returns the device configuration information created in step S702 to the print control apparatus 102, and the process proceeds to step S710. On the other hand, if the inquiry of the device configuration information is not received in step S708, the process proceeds to step S710.

In step S710, the CPU 301 determines whether or not the inquiry of the information of the sheet feed tray is received from the print control apparatus 102. If the inquiry of the information of the sheet feed tray in S603 and S604 of FIG. 6 is received, the process proceeds to S711. In step S711, the information of the sheet feed tray created in S703 is returned to the print controller 102, and the process proceeds to S712. Note that even if the inquiry of the information of the sheet feed tray is not received in step S710, the process proceeds to step S712.

In step S712, the CPU 301 determines whether the inquiry of the information of the sheet list is received from the print control apparatus 102. If the inquiry of the information of the sheet list in step S606 of FIG. 6 is received, the process proceeds to step S713. In step S713, the CPU 301 returns the information of the sheet list created in step S704 to the print control apparatus 102, and the process proceeds to step S714. If the inquiry of the information of the sheet list is not received in step S712, the process proceeds to step S714.

In step S714, the CPU 301 determines whether or not the inquiry of the information of the adjustment value is received from the print control apparatus 102. If the inquiry of the information of the adjustment value in step S608 of FIG. 6 is received, the process proceeds to step S715. In step S715, the CPU 301 returns the information of the adjustment value to the print control apparatus 102, and proceeds to step S716. If the inquiry of the information of the sheet feed tray is not received in step S714, the process proceeds to step S716. In step S716, the CPU 301 determines whether or not the request for registration of destination information for transmitting the event is received from the print control apparatus 102 when the state of the image forming apparatus 103 is changed. If the request for registration is received, the process proceeds to step S717. In step S717, the CPU 301 adds the print control apparatus 102 to the event transmission destination, and then proceeds to step S718. On the other hand, even if the registration request of the event transmission destination is not received in step S716, the process proceeds to step S718. In step S718, the CPU 301 terminates the initialization process if all of the processes in steps S706, S708, S710, S712, S714, and S716 are successful. On the other hand, if all the operations are not successful, the process returns to step S706.

Note that the sheet feed unit 116 in the first embodiment is an example of a sheet feed tray, and may be a sheet feed tray of another mechanism such as an inserter or a manual feed tray, and a form thereof is not limited.

Returning to FIG. 5, for example, when the sheet feed button 510 of a sheet feed tray 1 is instructed by the pointing device 115 or the like, the sheet setting screen of the sheet feed tray 1 is displayed, and the sheet setting for the sheet feed tray 1 and the set value of the sheet can be changed. The sheet feed tray buttons 511 to 517 are similar to the paper feed tray button 510, and their description will be omitted. Further, although not described in detail in the embodiment, the sheet feed tray includes all sheet feed trays such as an inserter or a manual feed tray. In the following description, the pointing device 115 or the like is used when an application is operated by pressing buttons, but such description will be omitted.

FIG. 8 is a diagram illustrating an example of a sheet setting management table 800 of the print control apparatus 102 according to the first embodiment.

In the sheet setting management table 800, size information such as names, basis weight, sizes, widths, and heights of the sheet, surface smoothness, and setting values of adjustment items are registered in association with a sheet ID for specifying the sheet. The setting values of the adjustment items include, for example, the sheet conveyance of the first fixing unit, the sheet conveyance of the second fixing unit, the transfer voltage, the image position adjustment, the secondary transfer voltage, and the like.

The sheet management unit 453 can edit, add, delete, or search the sheet information from the sheet setting management table 800. The sheet setting management table 800 is a management table for managing sheet information for each sheet ID, and is stored in the external storage device 409 that is a non-volatile area. Although it is described that the sheet setting management table 800 is stored in the external storage device 409, the sheet setting management table 800 may be stored in the external storage device 310 of the image forming apparatus 103, and the print control apparatus 102 may acquire the sheet setting management table 800 from the image forming apparatus 103 and store the sheet setting management table 800 in the RAM 402 during the execution of the program. The sheet feed tray management unit 454 communicates with the image forming apparatus 103 to manage the acquired the information of the sheet feed tray.

Figure 9:
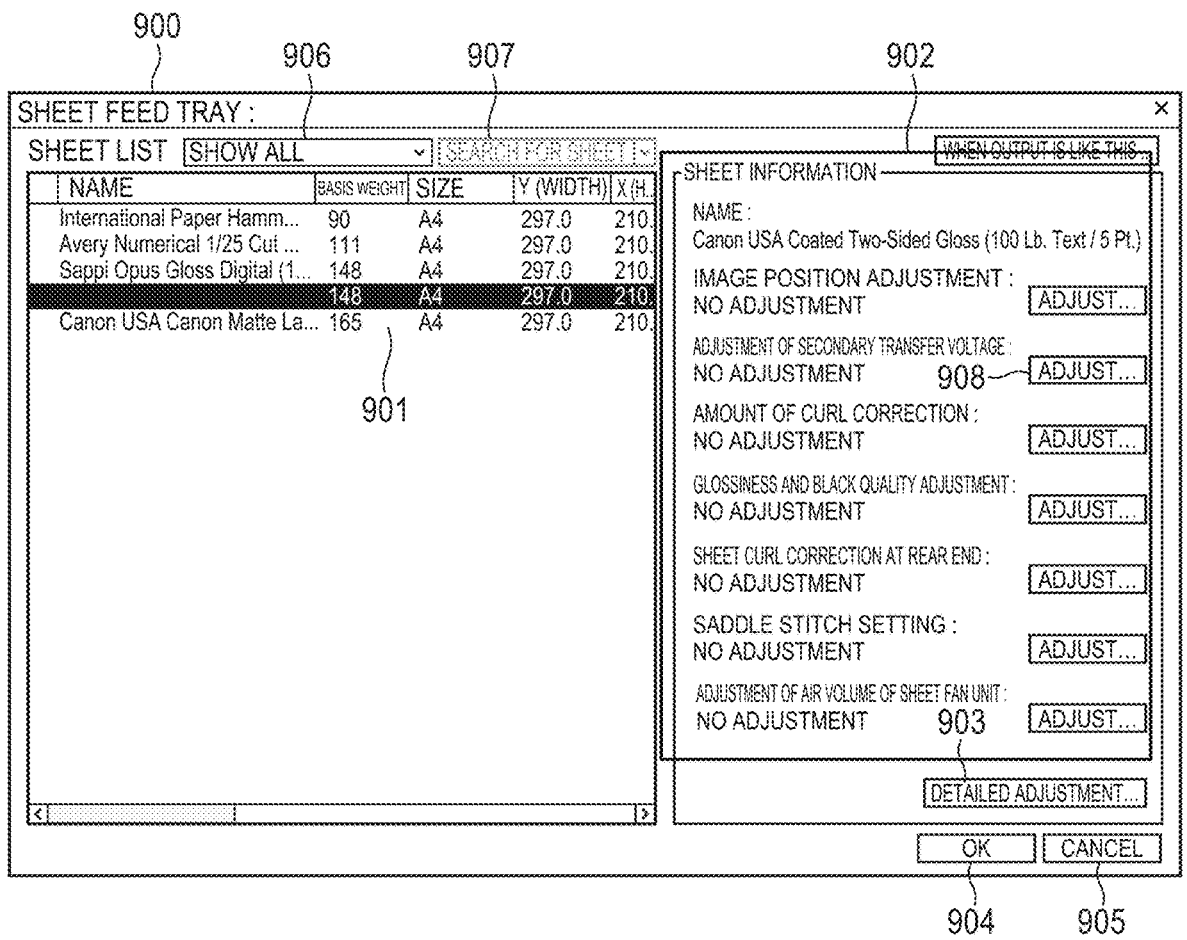
FIG. 9 is a diagram illustrating a paper feed tray screen displayed when the paper feed tray button on the top screen is pressed in the first embodiment.

FIG. 9 is a sheet feed tray screen displayed when one of the sheet feed tray buttons 510 to 517 on the top screen 500 is pressed in the first embodiment.

A sheet feed stage screen 900 is drawn in the video memory according to an instruction from the CPU 401, and the image data drawn in the video memory is output as a video signal to the display unit 111 for display. The sheet feed tray screen 900 includes a sheet list display area 901, a sheet information display area 902, a detail adjustment button 903 for displaying a setting screen of other sheet information other than the sheet information display area 902, an OK button 904, and a cancel button 905. The sheet feed tray screen 900 further includes a pull-down menu 906 for selecting a display method of a paper list and an input area for sheet search 907.

The sheet list display area 901 is an area for displaying a sheet list. Here, a type of sheet is displayed in the column direction, and sheet information such as attributes of the sheet is displayed in the row direction. The row of the selected sheet is highlighted. When the sheet feed tray screen 900 is displayed, the sheet set for the sheet feed tray is selected on the sheet list display area 901. When a sheet is selected from the sheet list display area 901, information of the selected sheet is displayed in the sheet information display area 902. When another sheet is selected in the sheet list display area 901 and the OK button 904 is pressed, the controller 400 sets the sheet to the image forming apparatus 103. When another sheet is selected in the sheet list display area 901 and the cancel button 905 is pressed, the controller 400 closes the sheet feed tray screen 900 without setting the sheet for the image forming apparatus 103.

Next, each item in the sheet information display area 902 will be described. In order to improve the convenience of the user, only the sheet information frequently used by the user is displayed as an example in the first embodiment. The user is an operator who performs adjustments. Specifically, the name of the sheet and various adjustment items (image position adjustment, secondary transfer voltage adjustment, curl correction amount, glossiness/black quality adjustment, rear blank correction, saddle binding setting, sheet fan air volume adjustment) are displayed. In the sheet information display area 902, the currently selected sheet name and information about whether or not each adjustment value is changed from an initial value of the image forming apparatus 103 are displayed. If the adjustment value has not changed from the initial value, "Not adjusted" is displayed. If the adjustment value has changed from the initial value, "Adjusted" is displayed. An adjustment button is displayed for items adjustable from the print control apparatus 102, and an adjustment screen corresponding to the adjustment button can be displayed by pressing the adjustment button. An adjustment screen for the secondary transfer voltage described later can be displayed by pressing a secondary transfer adjustment button 908 in the sheet information display area 902.

The detail adjustment button 903 is used to confirm information that is not displayed in the sheet information display area 902 and to change the setting.

The pull-down menu 906 used for selecting a display method of the sheet list shows methods of filtering sheets to be displayed in the sheet list display area 901.

The input area for sheet search 907 is an area for an operator to input a keyword for searching a desired sheet from the sheet in the sheet list display area 901. The incremental search can be performed in the input area for sheet search 907, so that the search is automatically performed each time a character is input.

Next, the adjustment of the secondary transfer voltage according to the present embodiment will be described. Depending on the type of sheet used by the user, the moisture amount or resistance value of the sheet may be significantly different from those of the standard sheet. As a result, the optimum transfer may not be performed with the secondary transfer voltage used for the default sheet. More specifically, the secondary transfer voltage to be applied must first be a voltage necessary to transfer the toner on the intermediate transfer body. Then, the secondary transfer voltage is set so as not to cause abnormal discharge when the secondary transfer voltage is further increased. Depending on the state of the sheet used by the user, the secondary transfer voltage may need to be increased because the resistance of the sheet is too high for the default setting so that the voltage required to transfer the toner is insufficient. In addition, the discharge easily occurs when the amount of moisture in the sheet is reduced. The secondary transfer voltage must be lowered for some sheet since the image quality is deteriorated by the abnormal discharge in case of using the default setting. Therefore, it is necessary to select the optimum secondary transfer voltage by changing and outputting the secondary transfer voltage.

Figure 10A:
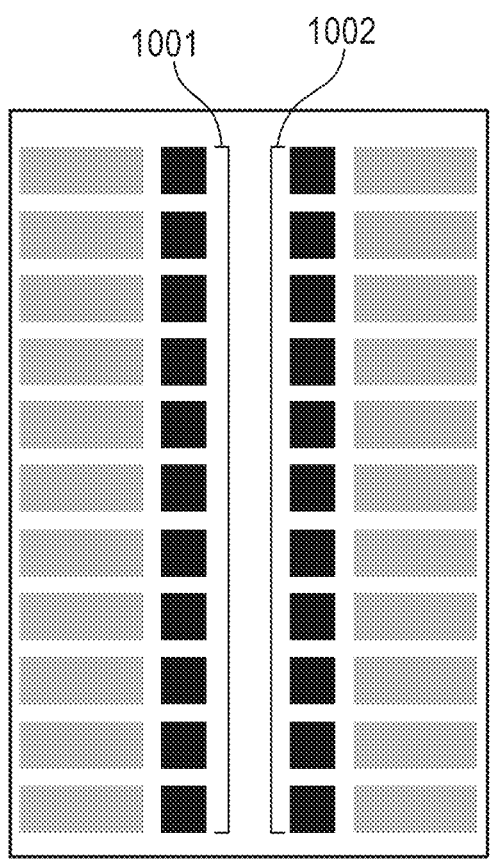
FIG. 10A is a chart for rough adjusting secondary transfer voltage to be read by the reading apparatus according to the first embodiment.
Figure 10B:
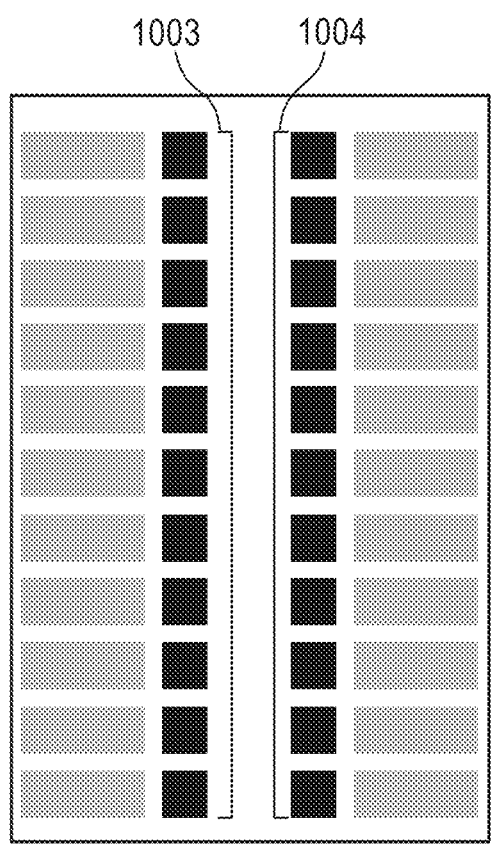
FIG. 10B is a chart for fine adjusting secondary transfer voltage to be read by the reading apparatus according to the first embodiment.

In the present embodiment, the secondary transfer voltage is adjusted by reading the charts illustrated in FIGS. 10A and 10B in the reading apparatus 117 and adjusting the voltage so that the transfer efficiency falls within a predetermined range. In the charts of FIGS. 10A and 10B, a blue solid pattern 1001 and a black solid pattern 1002 are printed while changing the secondary transfer voltage applied to the secondary transfer roller 208 when the print engine 210 operates by performing automatic adjustment of the secondary transfer voltage, which will be described later. FIG. 10A shows a chart (referred to herein as a rough adjustment chart) in which the entire adjustable range of the secondary transfer voltage is printed while the secondary transfer voltage is varied uniformly (in this case, from 1750 V to 3250 V at intervals of 150 V). The rough adjustment chart is generally used to adjust the secondary transfer voltage, for example, before using unadjusted sheet. FIG. 10B shows a chart (referred to herein as a fine adjustment chart) in which a blue solid pattern 1003 and a black solid pattern 1004 are printed in the vicinity of a certain secondary transfer voltage while changing the secondary transfer voltage at a fine stage (in this case, from 2500 V to 3000 V at intervals of 50 V). The fine adjustment chart is used when the secondary transfer voltage is finely adjusted after the adjustment by the rough adjustment chart, or when the secondary transfer voltage is adjusted again because of the lapse of time for the adjusted sheet. The reading apparatus 117 reads these charts in the imaging unit 325 according to the instruction of the CPU 322, stores the read results in the RAM 324, and notifies the CPU 301 via the communication interface 321 and the reading apparatus interface 315. The CPU 301 stores the read result in the RAM 302, and determines whether the blue solid pattern and the black solid pattern are both within a specified range.

Figure 11:
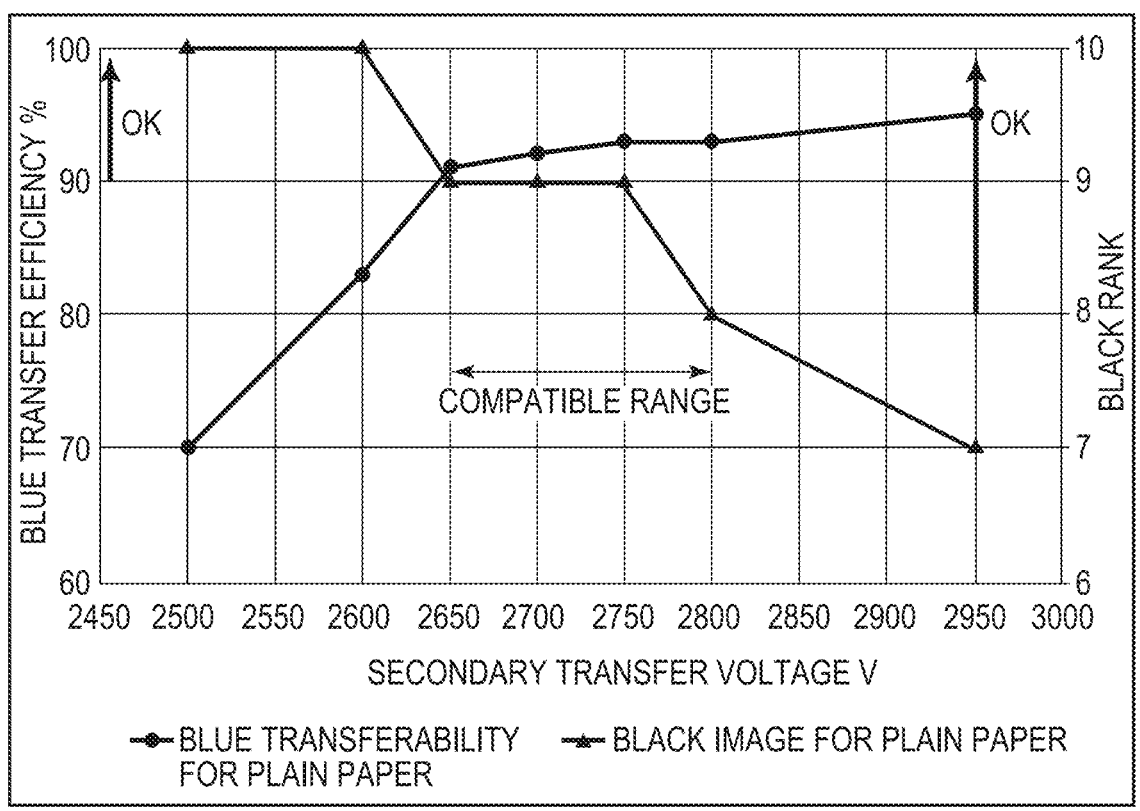
FIG. 11 is a diagram illustrating an example of a result of reading a chart of secondary transfer voltage adjustment in the reading apparatus according to the first embodiment.

FIG. 11 illustrates a result of the reading. In this example, it is acceptable if the transfer efficiency for the blue solid pattern shows 90% or more and a black rank shows eight or more. In this figure, the transfer efficiency and the black rank satisfy the conditions if printing is performed at the secondary transfer voltage of 2650 V to 2800 V. The CPU 301 stores, in the external storage device 311, the lowest secondary transfer voltage among the secondary transfer voltages satisfying the conditions of the transfer efficiency and the black rank as the adjustment value, and as the secondary transfer voltage of the corresponding sheet. In the present embodiment, the lowest secondary transfer voltage among the secondary transfer voltages satisfying the conditions is stored. However, for example, the secondary transfer voltage with the best conditions may be stored. The secondary transfer voltage is stored only for the front surface in the case of one side printing, and for the front surface and the back surface in the case of two-sided printing. In the case of the two-sided printing, the printing is performed in a positional relationship where the blue solid pattern and the black solid pattern do not overlap each other on both sides so as not to affect reading.

FIGS. 12A to 12D show screen examples of the secondary transfer voltage adjustment in the sheet management application after the secondary transfer adjustment button 908 is pressed.

Figure 13:
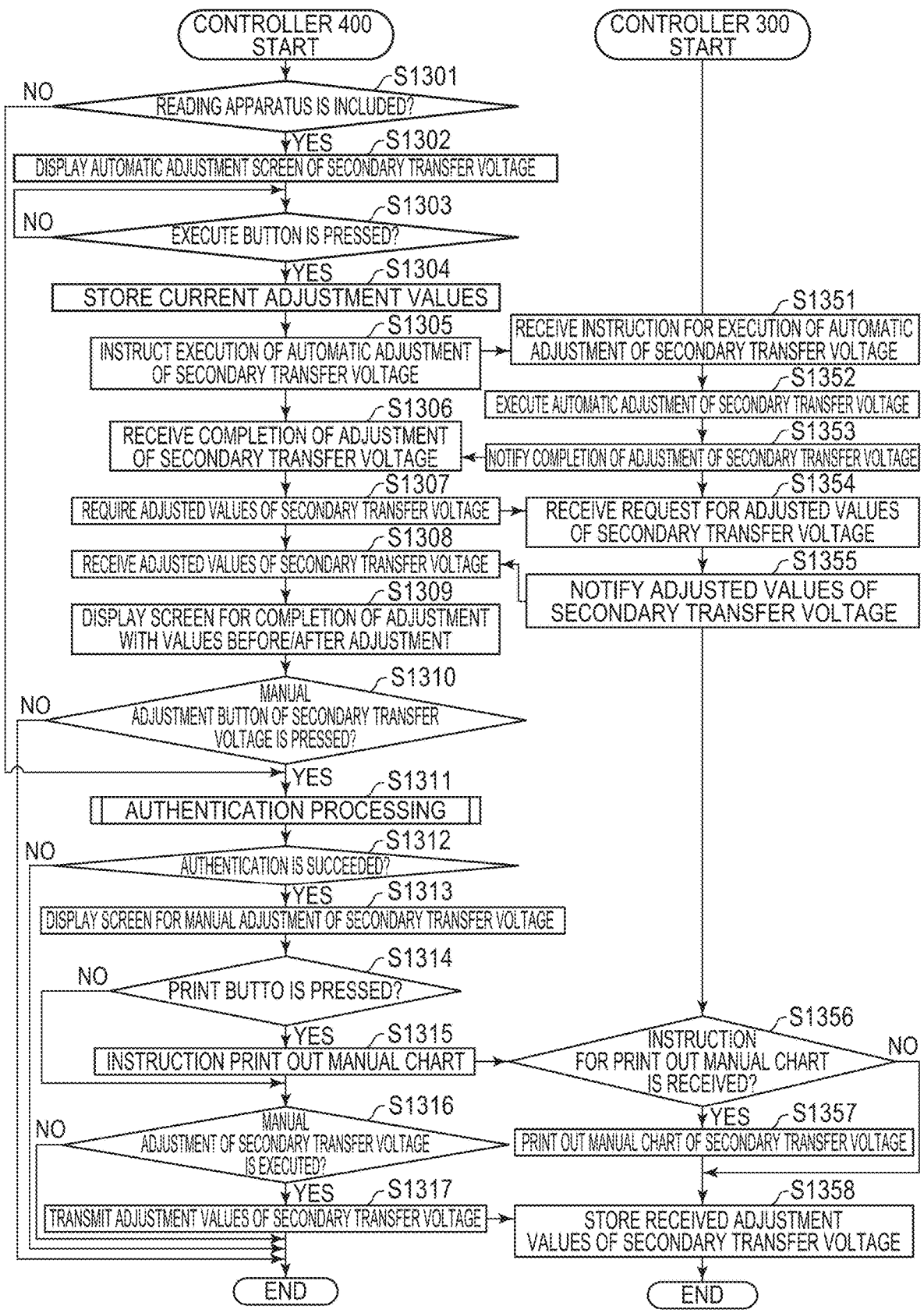
FIG. 13 is a flowchart of adjustment processing for the paper management application according to the first embodiment.

FIG. 13 shows a flowchart relating to the adjustment of the secondary transfer voltage according to the first embodiment. In FIG. 13, the flowchart for the controller 400 is executed by the CPU 401 reading out a program stored in the ROM 403 into the RAM 402 and executing the program. In FIG. 13, the flowchart for the controller 300 is executed by the CPU 301 reading out a program stored in the ROM 303 into the RAM 302 and executing the program. Further, the processing with communications between the controller 400 and the controller 300 is performed by the CPU 401 and the CPU 301 via the LAN controller 306, the control cable 108, and the LAN controller 406.

First, in step S1301, the CPU 401 determines whether or not the reading apparatus 117 is included in a result of determining devices connected to the image forming apparatus 103 in step S502. If it is determined that the image forming apparatus 103 includes the reading apparatus 117, the process proceeds to step S1302. On the other hand, if the image forming apparatus 103 does not include the reading apparatus 117, the process proceeds to step S1311.

In step S1302, the CPU 401 causes the display device 113 to display an automatic adjustment screen for adjustment by the automatic adjustment function shown in FIG. 12A, and the process proceeds to step S1303. In the automatic adjustment screen of FIG. 12A, a chart selection region 1201 is used for selecting whether to perform adjustment by using the rough adjustment chart or the fine adjustment chart, and a print surface selection region 1202 is used for selecting whether to adjust only the front surface or both surfaces. An execution button 1203 is used for automatically adjusting the secondary transfer voltage, and a cancel button 1204 is used for canceling the adjustment and returning to the sheet feed tray screen 900.

In step S1303, the CPU 401 determines whether or not the execution button 1203 is pressed. If the execution button 1203 is pressed, the process proceeds to step S1304. In step S1304, the CPU 401 stores the adjustment value of the current secondary transfer voltage in the RAM 402.

In step S1305, the CPU 401 instructs the controller 300 to perform the automatic adjustment together with the settings selected by the radio buttons included in the chart selection regions 1201 and the print surface selection region 1202 shown in FIG. 15. The CPU 301 of the controller 300 that has received the instruction to execute the automatic adjustment in step S1351 executes the automatic adjustment of the secondary transfer voltage in step S1352. The result of the automatic adjustment including the adjustment value after completing the adjustment of the secondary transfer voltage is stored in an external storage device 311.

In step S1353, the CPU 301 notifies the paper management application of the completion of the adjustment of the secondary transfer voltage, and in step S1306, the CPU 401 that has received the completion of the adjustment of the secondary transfer voltage requests the controller 300 for the adjusted value in step S1307.

The CPU 301 of the controller 300 that has received the request for the adjusted value in step S1354 notifies the CPU 401 of the adjusted value after completing the adjustment of the secondary transfer voltage stored in the external storage device 311 in step S1355. Upon receiving the adjustment value after the completion of the adjustment of the secondary transfer voltage in step S1308, the CPU 401 causes the display device 113 to display the execution result of the secondary transfer voltage shown in FIG. 12B in step S1309. An area 1211 is used for displaying the values before and after the adjustment, and in this case, the area 1211 indicates that the adjustment is made from 0 to +2 for the front surface and from 0 to +1 for the back surface. In step S1310, the CPU 401 determines whether a manual adjustment button 1212 or an OK button 1213 shown in FIG. 12B is pressed. If it is determined in step S1310 that the manual adjustment button 1212 is pressed, the process proceeds to step S1311. On the other hand, if the OK button 1213 is pressed, the CPU 401 terminates the process. Subsequently, in step S1311, the CPU 401 executes an authentication process. Details of the authentication process will be described later with reference to FIG. 17. In step S1312, it is determined whether the authentication is successful or not. If the authentication is successful, the process proceeds to step S1313, and the CPU 401 causes the display device 113 to display a manual adjustment screen of the secondary transfer voltage shown in FIG. 12C. On the other hand, if it is determined in step S1312 that the authentication is not successful, the CPU 401 terminates the process without displaying the manual adjustment screen for manually adjusting the secondary transfer voltage shown in FIG. 12C.

The manual adjustment screen for manually adjusting the secondary transfer voltage shown in FIG. 12C is a screen for performing adjustment by the manual adjustment function. The manual adjustment screen of the secondary transfer voltage includes an output button 1221 for outputting a chart used for manual adjustment, an adjustment value input region 1222 for inputting adjustment values, an OK button 1223, and a cancel button 1224. In the adjustment value input region 1222, the result after the automatic adjustment received by the CPU 401 in step S1308 is displayed. When the output button 1221 for outputting a chart used for the manual adjustment is pressed, a setting screen of the manual adjustment chart as shown in FIG. 12D is displayed. On the setting screen of the manual chart, a chart selection region 1231 is displayed for selecting whether to perform adjustment by using the rough adjustment chart or the fine adjustment chart as well as the automatic adjustment, and a print surface selection region 1232 is displayed for selecting whether to adjust only the front surface or both surfaces. Reference symbol 1233 denotes a selection area of the sheet feed tray for the chart. The selected sheet feed tray is displayed in the present example because the sheet is selected via the sheet feed tray buttons 510 to 517. A print button 1234 is used for instructing the controller 300 to print the manual chart. A cancel button 1235 is used to close the screen of FIG. 12D and return to the screen of FIG. 12C. In step S1314, the CPU 401 determines whether or not the print button 1234 is pressed. If the CPU 401 determines that the print button 1234 is pressed, the process proceeds to step S1315. On the other hand, if the print button is not pressed, that is, when the fine adjustment is made without chart output, the process proceeds to step S1316. In step S1315, the CPU 401 instructs the controller 300 to output the manual chart. In this case, information 1231, 1232, and 1233 are also notified as the chart setting. In step S1356, the CPU 301 of the controller 300 determines whether or not the manual chart output instruction is received. When it is determined that the manual chart output instruction is received, the CPU 301 outputs the manual chart in step S1357.

Figure 14A:
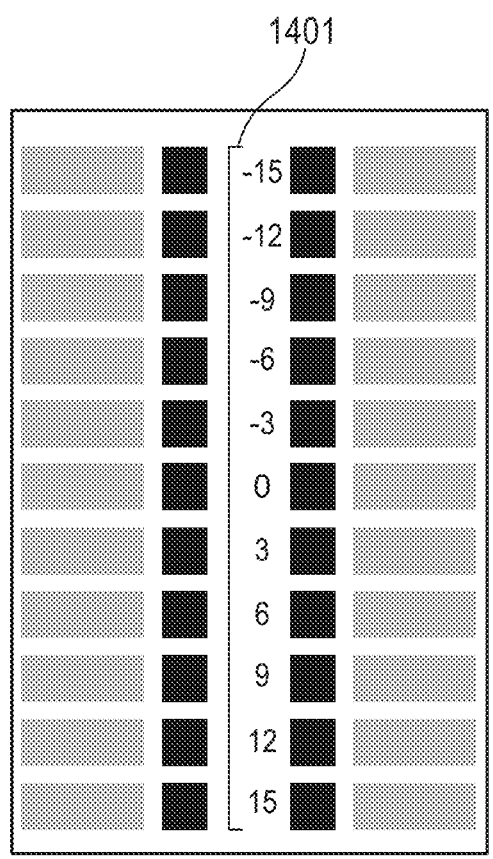
FIG. 14A illustrates an example of the manual chart for rough adjustment of secondary transfer voltages in the first embodiment.
Figure 14B:
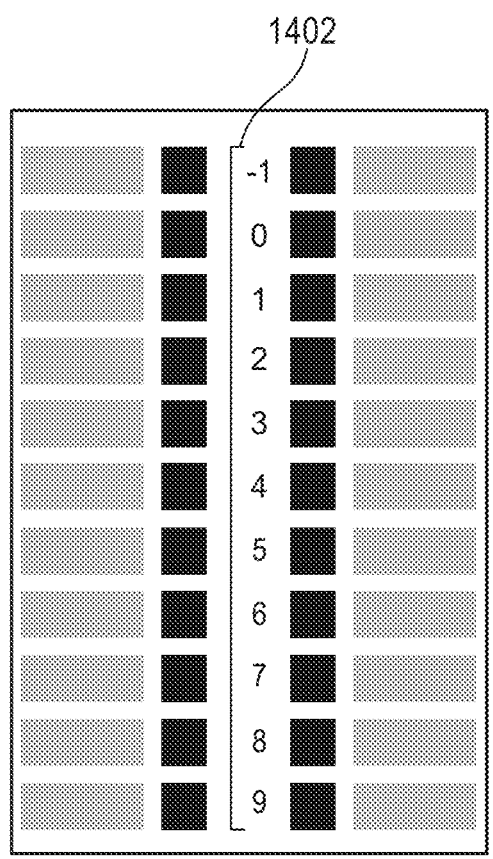
FIG. 14B illustrates an example of the manual chart for fine adjustment of secondary transfer voltages in the first embodiment.

FIG. 14A shows a chart of the manual and rough adjustment, and FIG. 14B shows a chart of the manual and fine adjustment. The patterns of the charts are same, except that the adjustment values are printed on 1401 and 1402 so that the user can easily determine the adjustment values. Note that these adjustment values are indicated by voltage levels. If an instruction of outputting the chart of the manual adjustment is not received in step S1356, the process proceeds to step S1358. The processes of step S1356 to S1358 mean that the manual adjustment is accepted even when the instruction of outputting the manual chart is not received.

The flow proceeds to the description of step S1316 on the controller 400 side. In step S1316, the CPU 401 determines whether an instruction to manually adjust the secondary transfer voltage is issued. That is, it is determined whether the OK button 1223 in FIG. 12C is pressed or not. If the OK button 1223 is pressed, the process proceeds to step S1317. On the other hand, if the cancel button 1224 is pressed, the CPU 401 terminates the process. In step S1317, the controller 300 is notified of the value of the adjustment value input region 1222. The controller 300 receives the value of the adjustment value input region 1222 in step S1358 and stores the received value in the external storage device 311. The manual adjustment screen of FIG. 12C may be displayed instead of the manual adjustment button 1212 of the screen of FIG. 12B.

Figure 17:
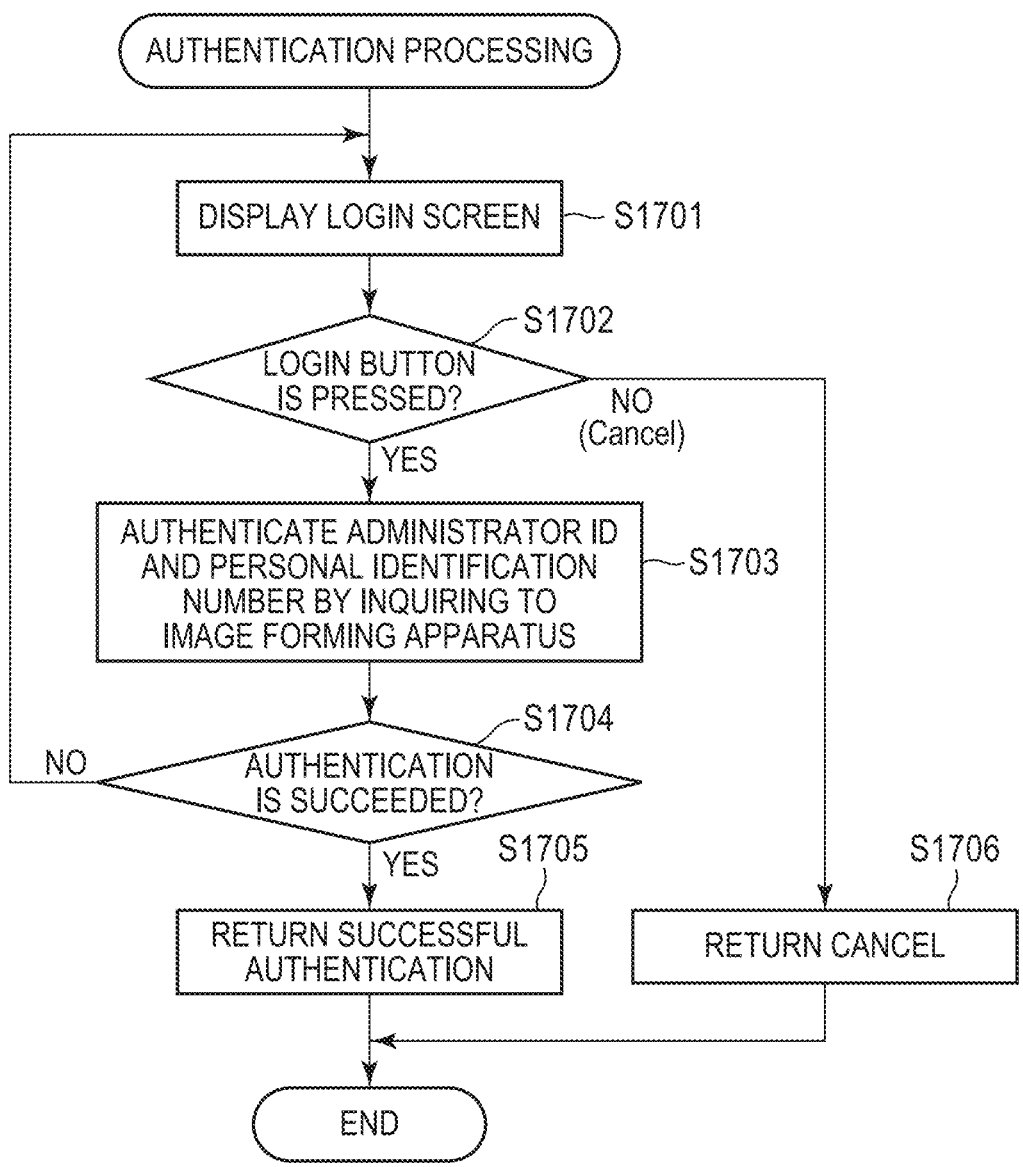
FIG. 17 is a flowchart of adjustment processing for the paper management application according to the first embodiment.

FIG. 17 is a flowchart describing the authentication process in step S1311 of FIG. 13 according to the first embodiment. In FIG. 17, the flowchart of the controller 400 is executed by the CPU 401 reading a program stored in the ROM 403 into the RAM 402 and executing the program.

Figure 16:
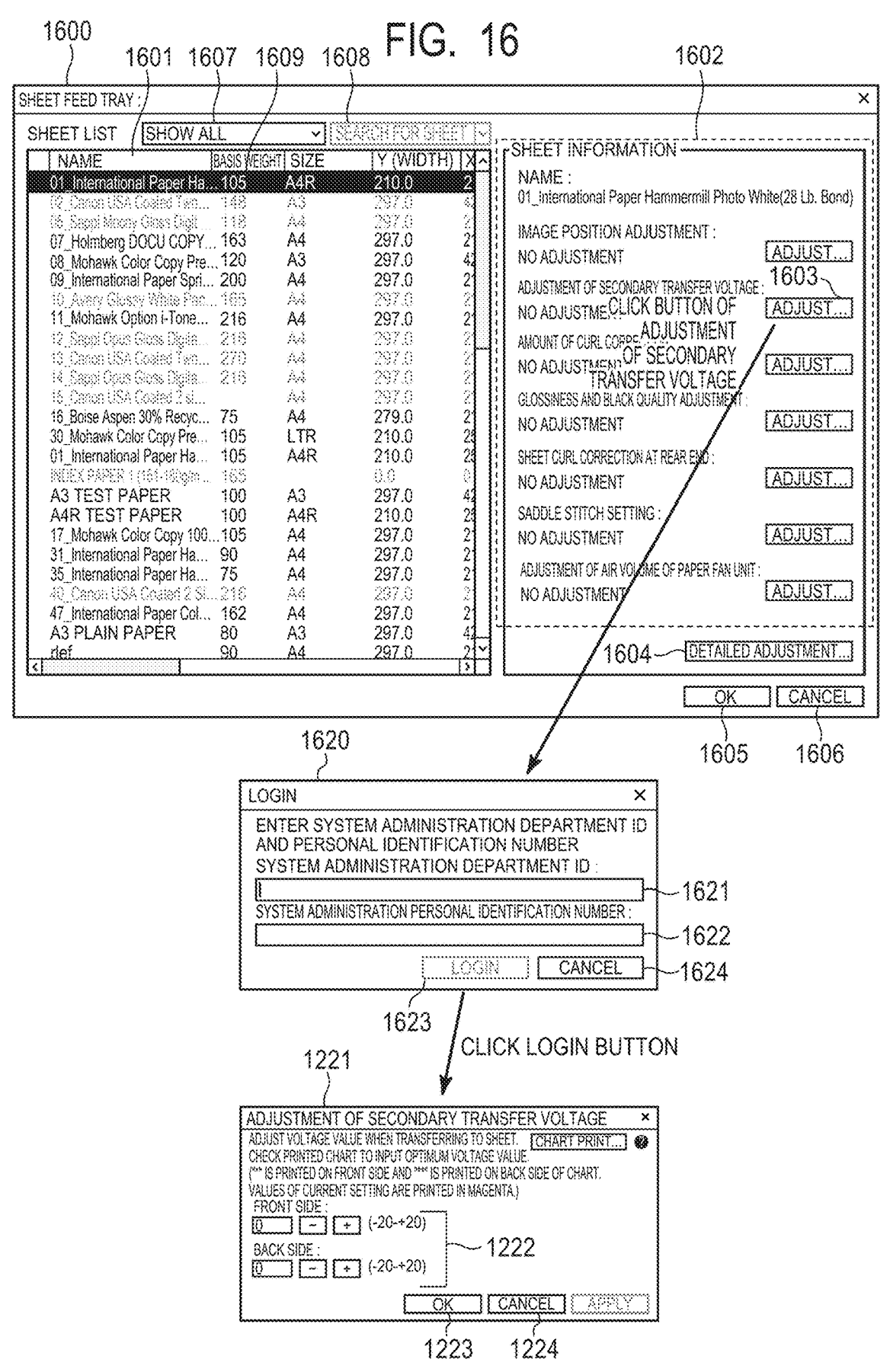

First, in step S1701, the CPU 401 causes the display device 113 to display a login screen (authentication screen) 1620 shown in FIG. 16 for the authentication of the user, and the process proceeds to step S1702.

In step S1702, the CPU 401 determines whether or not a login button 1623 is pressed on the login screen 1620. If it is determined that the login button 1623 is pressed on the login screen 1620, the process proceeds to step S1703. The CPU 401 transmits the information of the ID (system administrator ID) and the password inputted in the login screen 1620 to the image forming apparatus 103. On the other hand, if it is determined that the cancel button 1624 is pressed in the login screen 1620, the CPU 401 advances the process to step S1706. Then, the CPU 401 notifies the upper layer of the cancellation of the authentication and terminates the process.

The CPU 301 of the image forming apparatus 103 determines whether the transmitted system administrator ID and password match the authentication information stored in the external storage device 311, and if the authentication information matches, notifies the print control apparatus 102 that the authentication is successful.

In step S1704, the CPU 401 determines whether the user is successfully authenticated based on the authentication result notified from the image forming apparatus 103. If it is determined that the authentication is successful, the process proceeds to step S1705. On the other hand, if it is determined that the authentication is failed, the process proceeds to step S1701. In this way, the login screen 1620 is continuously displayed until the authentication is successful in the login screen 1620 or the cancel button 1624 is pressed to prompt the user to re-enter the ID and the password. In step S1705, the CPU 401 notifies the upper layer that the user is successfully authenticated, and terminates the process.

As described above, according to the first embodiment, if the reading apparatus 117 is mounted when the secondary transfer voltage is adjusted, the automatic adjustment by the reading apparatus 117 is performed without authentication, so that the adjustment can be performed even by an unskilled operator. On the other hand, if the reading apparatus 117 is not mounted, the authentication is performed before the manual adjustment is executed by the operator, and the operator is confirmed to be an authenticated user skilled in the manual adjustment, so that input of incorrect adjustment values can be suppressed.

Second Embodiment

In the first embodiment, a case where the automatic adjustment screen is always displayed when the reading apparatus 117 is mounted has been described. In the second embodiment, a case will be described in which the display of the automatic adjustment screen is prohibited under certain conditions even when the reading apparatus 117 is mounted.

For example, in a case of certain sheet to which a special coating is applied, the adjustment value may be calculated to be 0 due to the influence of the combination of the performance of the sensor in the reading apparatus 117 and the sheet characteristics during the automatic adjustment of the secondary transfer voltage. In such a case, an operator who has special skill performs the manual adjustment. Thereafter, it is not desirable that an operator who does not have special skill performs the automatic adjustment and overwrites the adjustment value to 0.

Figure 19:
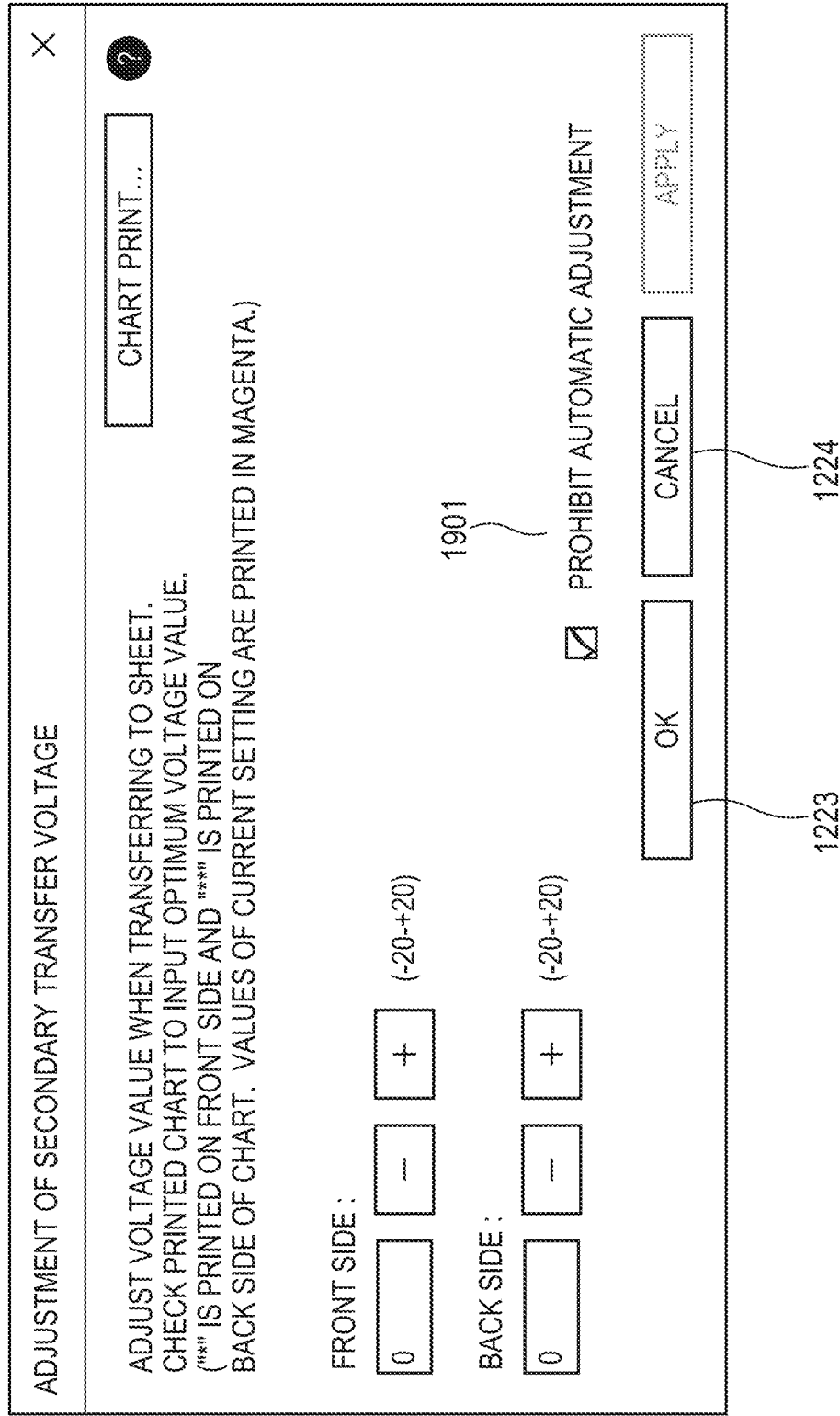
FIG. 19 is a diagram illustrating an example of the manual adjustment screen of the paper management application according to the second embodiment.

FIG. 19 shows an example of a screen for manually adjusting the secondary transfer voltage.

FIG. 19 is substantially the same as FIG. 12C, except that a check box 1901 is added to indicate whether the automatic adjustment is prohibited. The operator who passes the authentication checks the adjustment prohibition check box when performing the manual adjustment and then presses the OK button 1223 to prohibit further automatic adjustment. To cancel the automatic adjustment inhibition, the operator clears the check box.

Figure 18:
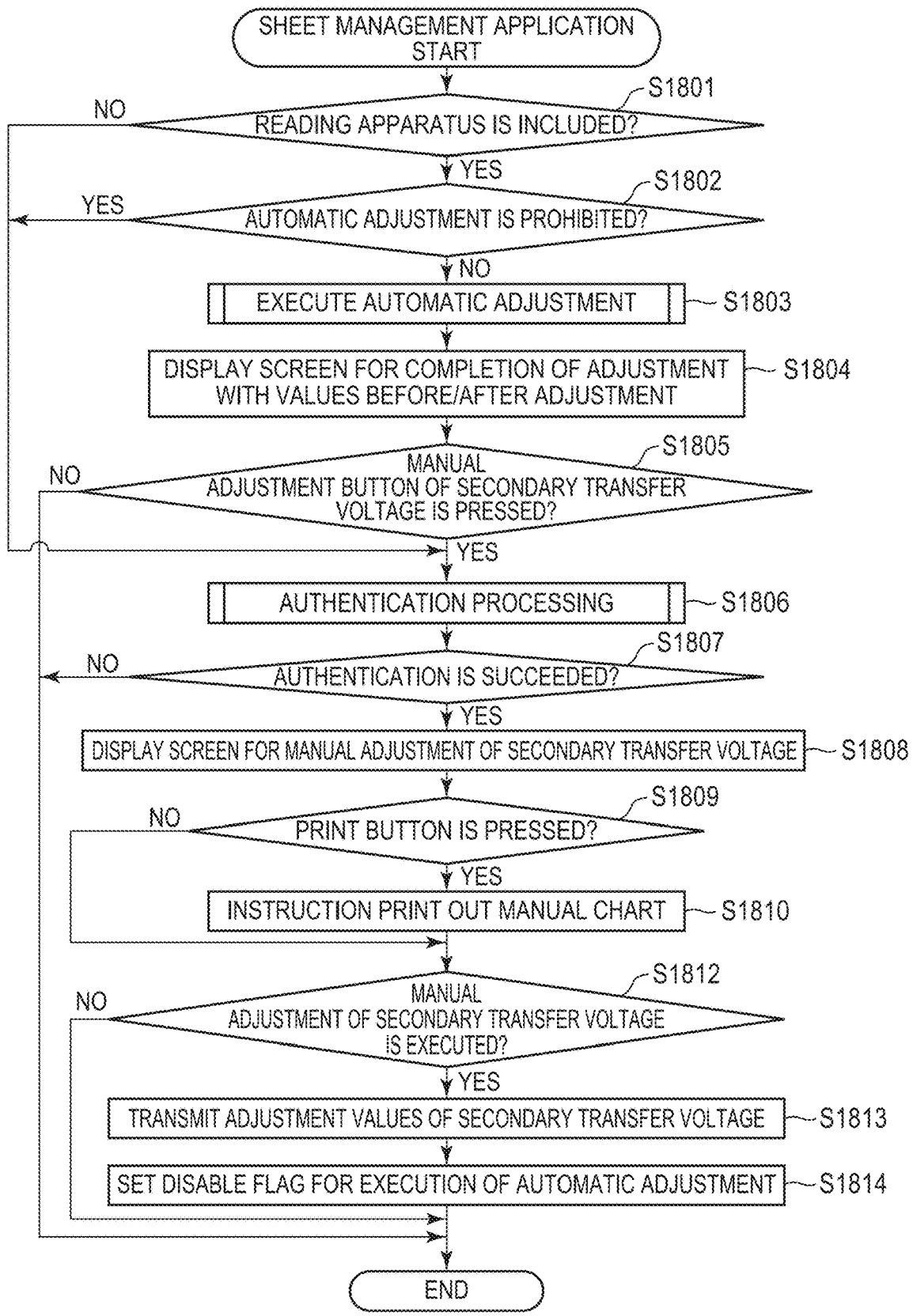
FIG. 18 is a flowchart of adjustment processing for the paper management application according to the second embodiment.

FIG. 18 shows a process flowchart of a paper management application executed by the controller 400 according to the second embodiment. In FIG. 18, the flowchart of the controller 400 is executed by the CPU 401 reading a program stored in the ROM 403 into the RAM 402 and executing the program.

First, in step S1801, as a result of determining the configuration of the apparatus connected to the image forming apparatus 103 in step S502, the CPU 401 determines whether or not the image forming apparatus 103 includes the reading apparatus 117. If it is determined that the image forming apparatus 103 includes the reading apparatus 117, the process proceeds to step S1802. On the other hand, if it is determined that the image forming apparatus 103 does not include the reading apparatus 117, the process proceeds to step S1806.

Subsequently, in step S1802, the CPU 401 refers to the internal setting value reflecting the value of the automatic adjustment inhibition check box shown in FIG. 19, and determines whether or not the automatic adjustment is inhibited. If it is determined that the automatic adjustment is not prohibited (No in step S1802), the process proceeds to step S1803. If it is determined that the automatic adjustment is prohibited (Yes in step S1802), the process proceeds to step S1806.

Since the automatic adjustment execution processing in step S1803 and the processing in step S1804 are the same steps as those in steps S1302 to S1308 in FIG. 13, descriptions thereof are omitted here.

In step S1804, the CPU 401 causes the display device 113 to display the execution result of the secondary transfer voltage shown in FIG. 12B.

In step S1805, the CPU 401 determines whether the manual adjustment button 1212 in FIG. 12B is pressed or the OK button 1213 in FIG. 12B is pressed.

If it is determined in step S1805 that the OK button 1213 is pressed, the CPU 401 terminates the process shown in the flowchart of FIG. 18. On the other hand, if it is determined that the manual adjustment button 1212 is pressed, the process proceeds to step S1806.

The authentication process and the secondary transfer voltage manual adjustment process in the subsequent steps S1806 to S1813 are the same step as those in steps S1311 to S1317 in FIG. 13, and therefore descriptions thereof are omitted.

In step S1814, the CPU 401 sets an execution prohibition flag for the automatic adjustment.

As described above, the automatic adjustment can be inhibited under certain conditions even if the reading apparatus 117 is mounted after the manual adjustment is performed. The above configuration prevents an operator from erroneously overwriting an adjustment value by performing the automatic adjustment after performing the manual adjustment.

Third Embodiment

In the first embodiment, the authentication is required at the time of the manual adjustment. On the other hand, in certain cases, it may be preferable to specify the authentication or non-authentication of the manual adjustment for each adjustment item or each paper type. In the third embodiment, such an example will be specifically described.

FIG. 20 is a diagram illustrating an example of a sheet adjustment function management table 2000 of the print control apparatus 102 according to the third embodiment. In the sheet adjustment function management table 2000, adjustment items are grouped, and whether the automatic adjustment can be executed for each adjustment item and whether the authentication is required at the time of the manual adjustment are managed. Whether each adjustment item can be automatically adjusted is determined by the capability of the apparatus and the setting of the automatic adjustment inhibition flag shown in FIG. 19. In addition, whether the authentication is required at the time of the manual adjustment can be arbitrarily switched by the administrator using a setting screen (not shown).

In the present embodiment, the front/rear end margin adjustment does not require the authentication when manually adjusting. This is because a size of the margin can be determined even by an operator with relatively little experience, and it is preferable to improve convenience rather than trouble of the authentication.

FIG. 21 illustrates an example of a sheet setting management table 2100 of the print control apparatus 102 according to the third embodiment. In the sheet setting management table 2100, in addition to the sheet setting management table described with reference to FIG. 8, the presence or absence of authentication at the time of the manual adjustment can be specified for each paper ID. In this example, the authentication is required for all but surface high-quality paper. The reason is that the sheet other than the high-quality paper is relatively small in stock, reprinting is not easy when the manual adjustment value is not appropriate, and erroneous operations are to be prevented rather than improving convenience.

As described above, in the third embodiment, the presence or absence of authentication at the time of the manual adjustment can be designated for each adjustment item or each sheet type, so that it is possible to prevent an operator with insufficient skill from erroneously inputting setting values and to simultaneously improve convenience.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-081296, filed May 12, 2021, which is hereby incorporated by reference herein in its entirety.

What is claimed is:

1. A printing system comprising:
a printer configured to print an image on a sheet, to convey the sheet to a reader to read the image, and to perform adjustment for printing an image on a another sheet based on the image read by the reader;
a user interface; and
a processor and a memory in communication with each other and to perform operations including:
determining whether or not the printing system includes the reader,
performing, in a case where it is determined that the printing system does not include the reader, authentication of an operator and then performing execution of a manual adjustment function for adjusting predetermined adjustment items based on adjustment values received via the user interface after the authentication of the operator, and
performing, in a case where it is determined that the printing system includes the reader, execution of an automatic adjustment function for adjusting the predetermined adjustment items based on the image read by the reader without performing the authentication of the operator.

2. The printing system according to claim 1, wherein the operations further include:
determining whether the reader is mounted,
performing, in a case where it is determined that the reader is mounted, execution of the manual adjustment function after the authentication, and
performing, in the case where it is determined that the reader is mounted, execution of the automatic adjustment function without performing the authentication.

3. The printing system according to claim 2, wherein, in a case where it is determined that the reader is not mounted, the operations further include:
performing execution of the manual adjustment function after the authentication, and
controlling not to execute the automatic adjustment function.

4. The printing system according to claim 1,
wherein the operations further include transmitting an inquiry to the reader, and
wherein determining includes determining whether or not the printing system includes the reader based on a result of the inquiry.

5. The printing system according to claim 1, wherein the authentication is executed based on authentication information received via an authentication screen.

6. The printing system according to claim 1, wherein the adjusting of the predetermined adjustment items includes adjusting a secondary transfer voltage.

7. The printing system according to claim 1, wherein the adjusting of the predetermined adjustment items includes adjusting a printing position.

8. The printing system according to claim 1, wherein the reader is provided at a position located downstream of the printer in a sheet conveyance direction.

9. A method for a printing system having a printer configured to print an image on a sheet, to convey the sheet to a reader to read the image, and to perform adjustment for printing an image on another sheet based on the image read by the reader, and having a user interface, the method comprising:
determining whether or not the printing system includes the reader;
performing, in a case where it is determined that the printing system does not include the reader, authentication of an operator and then performing execution of a manual adjustment function for adjusting predetermined adjustment items based on adjustment values received via the user interface after the authentication of the operator; and
performing, in a case where it is determined that the printing system includes the reader, execution of an automatic adjustment function for adjusting the predetermined adjustment items based on the image read by the reader without performing the authentication of the operator.

10. The method according to claim 9, further comprising:
determining whether the reader is mounted;
performing, in a case where it is determined that the reader is mounted, execution of the manual adjustment function after the authentication; and
performing, in the case where it is determined that the reader is mounted, execution of the automatic adjustment function without performing the authentication.

11. The method according to claim 10, wherein, in a case where it is determined that the reader is not mounted, the method further comprising:
performing execution of the manual adjustment function after the authentication; and
controlling not to execute the automatic adjustment function.

12. The method according to claim 9, further comprising transmitting an inquiry to the reader,
wherein determining includes determining whether or not the printing system includes the reader based on a result of the inquiry.

13. The method according to claim 9, wherein the authentication is executed based on authentication information received via an authentication screen.

14. The method according to claim 9, wherein the adjusting of the predetermined adjustment items includes adjusting a secondary transfer voltage.

15. The method according to claim 9, wherein the adjusting of the predetermined adjustment items includes adjusting a printing position.

16. The method according to claim 9, wherein the reader is provided at a position located downstream of the printer in a sheet conveyance direction.

17. A non-transitory computer-readable storage medium storing a program to cause a computer to perform a method for a printing system having a printer configured to print an image on a sheet, to convey the sheet to a reader to read the image, and to perform adjustment for printing an image on another sheet based on the image read by the reader, and having a user interface, the method comprising:
determining whether or not the printing system includes the reader;
performing, in a case where it is determined that the printing system does not include the reader, authentication of an operator and then performing execution of a manual adjustment function for adjusting predetermined adjustment items based on adjustment values received via the user interface after the authentication of the operator; and performing, in a case where it is determined that the printing system includes the reader, execution of an automatic adjustment function for adjusting the predetermined adjustment items based on the image read by the reader without performing the authentication of the operator.

18. The printing system according to claim 1, wherein performing authentication of the operator includes confirming the operator to be an authenticated user skilled in manual adjustment of a secondary transfer voltage so that input of incorrect adjustment values can be suppressed.

19. A printing system comprising:
a printer to print an image on a sheet;
a user interface; and
a controller configured to perform a manual adjustment function for performing a predetermined adjustment based on adjustment values received via the user interface and an automatic adjustment function for performing the predetermined adjustment by causing the printer to print the image on another sheet and causing a conveyor to convey the another sheet to a reader and performing adjustment based on the image read by the reader,
wherein, if the manual adjustment function is selected, the controller performs authentication of an operator and then performing the manual adjustment function after the authentication of the operator, and
wherein, if the automatic adjustment function is selected, the controller performs the automatic adjustment function without performing the authentication of the operator.

20. The printing system according to claim 19, wherein the predetermined adjustment includes adjustment of a secondary transfer voltage.

21. The printing system according to claim 19, wherein adjusting the predetermined adjustment includes adjustment of a printing position.

22. The printing system according to claim 19, wherein the reader is provided at a position located downstream of the printer in a sheet conveyance direction.

23. An information processing apparatus to communicate with a printer configured to print an image on a sheet, the information processing apparatus comprising
a user interface; and
a controller configured to perform a manual adjustment function for performing a predetermined adjustment based on adjustment values received via the user interface and an automatic adjustment function for performing the predetermined adjustment by causing the printer to print the image on another sheet and causing a conveyor to convey the another sheet to a reader and performing adjustment based on the image read by the reader,
wherein, if the manual adjustment function is selected, the controller performs authentication of an operator and then performing the manual adjustment function after the authentication of the operator, and
wherein, if the automatic adjustment function is selected, the controller performs the automatic adjustment function without performing the authentication of the operator.

24. The printing system according to claim 23, wherein the predetermined adjustment includes adjustment of a secondary transfer voltage.

25. The printing system according to claim 23, wherein adjusting the predetermined adjustment includes adjustment of a printing position.

26. The printing system according to claim 23, wherein the reader is provided at a position located downstream of the printer in a sheet conveyance direction.

* * * * *